United States Patent
Iizumi

(10) Patent No.: US 10,716,410 B2
(45) Date of Patent: Jul. 21, 2020

(54) APPARATUSES, SYSTEMS AND METHODS FOR TEMPORARY PLACEMENT OF A LIVING OBJECT ON A SEAT

(71) Applicant: Beanko LLC, San Francisco, CA (US)

(72) Inventor: Christine K. Iizumi, Millbrae, CA (US)

(73) Assignee: Beanko LLC, San Francisco, CA (US)

( * ) Notice: Subject to any disclaimer, the term of this patent is extended or adjusted under 35 U.S.C. 154(b) by 0 days.

(21) Appl. No.: 16/075,534

(22) PCT Filed: Feb. 3, 2017

(86) PCT No.: PCT/US2017/016593
§ 371 (c)(1),
(2) Date: Aug. 3, 2018

(87) PCT Pub. No.: WO2017/136783
PCT Pub. Date: Aug. 10, 2017

(65) Prior Publication Data
US 2019/0053635 A1  Feb. 21, 2019

Related U.S. Application Data

(60) Provisional application No. 62/291,370, filed on Feb. 4, 2016.

(51) Int. Cl.
*A47D 5/00* (2006.01)
*B60N 3/00* (2006.01)
*B60N 2/90* (2018.01)

(52) U.S. Cl.
CPC .............. *A47D 5/006* (2013.01); *B60N 3/001* (2013.01); *B60N 3/004* (2013.01); *B60N 2002/905* (2018.02)

(58) Field of Classification Search
CPC . A47C 1/16; A47D 5/006; B60N 2/28; B60N 2/3097; B60N 2002/2896;
(Continued)

(56) References Cited

U.S. PATENT DOCUMENTS 1,653,246 A * 12/1927 Zichy .................. A47D 5/006
                                                    206/223
2,359,599 A * 10/1944 Allen .................. B60N 2/283
                                                    297/182

(Continued)

OTHER PUBLICATIONS

International Preliminary Report on Patentability, dated Aug. 7, 2018, for PCT Application No. PCT/US2017/016593, filed Feb. 3, 2017, 8 pages.

(Continued)

*Primary Examiner* — Ryan D Kwiecinski
(74) *Attorney, Agent, or Firm* — Morrison & Foerster LLP

(57) ABSTRACT

The present disclosure discloses apparatuses, systems and methods for temporary placement of a living object on a seat comprising a surface and a back. The foldable apparatus comprises a pad layer comprising a first panel defining a perimeter and including a first edge, wherein the living object is placed on the first panel of the pad layer when the foldable apparatus is unfolded and the pad layer is positioned substantially horizontally on the surface of the seat; and a back layer foldably connected to the pad layer along the first edge, wherein one or both of the pad layer and the back layer comprise a first connector configured to secure the pad layer and the back layer to each other, thereby keeping the foldable apparatus in a folded configuration, and to allow unfolding of the foldable apparatus with one-hand operation.

20 Claims, 12 Drawing Sheets

(58) Field of Classification Search
CPC .. B60N 2002/905; B60N 3/001; B60N 3/004; B64D 11/0612
See application file for complete search history.

(56) References Cited

U.S. PATENT DOCUMENTS

| | | | |
|---|---|---|---|
| 2,676,337 A | 4/1954 | Soeder | |
| 3,265,437 A * | 8/1966 | Mincieli | A47C 7/38 297/378.1 |
| 4,885,200 A | 12/1989 | Perdelwitz et al. | |
| 5,584,422 A * | 12/1996 | Bond-Madsen | A47C 7/425 224/155 |
| 5,852,838 A | 12/1998 | Johnson | |
| 6,079,773 A * | 6/2000 | Hassan | B60N 2/90 297/188.13 |
| 6,298,509 B1 * | 10/2001 | Vickers | A47D 5/006 5/655 |
| 6,327,726 B1 * | 12/2001 | Weber | A47D 5/006 5/655 |
| 6,421,856 B1 * | 7/2002 | Furnback | A47D 5/00 5/118 |
| 6,561,582 B1 * | 5/2003 | Steadman | B60N 2/2821 297/188.2 |
| 6,773,065 B1 | 8/2004 | Stamper | |
| 7,357,452 B2 | 4/2008 | Pollack | |
| 7,530,635 B2 * | 5/2009 | Schramek-Flye | A47D 1/103 297/17 |
| 7,677,662 B2 * | 3/2010 | Thompson | A47C 31/11 297/188.01 |
| 7,797,774 B1 | 9/2010 | Beyert | |
| 7,832,037 B2 | 11/2010 | Overtone | |
| 8,316,490 B1 | 11/2012 | Bilak et al. | |
| 8,732,873 B2 | 5/2014 | Iskowitz | |
| 8,894,140 B2 * | 11/2014 | Cho | B60R 7/043 297/188.2 |
| 2002/0140246 A1 | 10/2002 | Worrell et al. | |
| 2004/0026971 A1 * | 2/2004 | McClellan-Derrickson | B64D 11/062 297/250.1 |
| 2004/0099186 A1 | 5/2004 | Wojcik | |
| 2006/0150324 A1 | 7/2006 | Jackson et al. | |
| 2007/0084891 A1 * | 4/2007 | Gillespie | A45F 4/02 224/155 |
| 2008/0016623 A1 * | 1/2008 | Gold | A45C 9/00 5/655 |
| 2010/0138995 A1 * | 6/2010 | Smith | A47D 5/006 5/424 |
| 2010/0205747 A1 * | 8/2010 | Iskowitz | A47D 5/00 5/655 |
| 2011/0155024 A1 * | 6/2011 | McCaffrey | B60N 3/004 108/26 |
| 2014/0090175 A1 * | 4/2014 | Thrailkill | A47D 15/008 5/655 |
| 2014/0259394 A1 | 9/2014 | Iskowitz | |
| 2014/0317853 A1 * | 10/2014 | Mullins | A47D 5/00 5/655 |
| 2015/0130231 A1 * | 5/2015 | Lindsay | B60N 2/34 297/120 |
| 2016/0318430 A1 * | 11/2016 | Umlauf | B60N 2/90 |
| 2017/0303701 A1 * | 10/2017 | Degon | A47D 5/006 |
| 2018/0020843 A1 * | 1/2018 | Hornor | A47D 5/006 5/655 |
| 2018/0206650 A1 * | 7/2018 | Kong | A47D 5/006 |
| 2019/0029217 A1 * | 1/2019 | Ryan | A01K 1/0353 |

OTHER PUBLICATIONS

International Search Report, dated Apr. 20, 2017, for PCT Application No. PCT/US2017/016593, filed Feb. 3, 2017, 2 pages.
Written Opinion of the International Searching Authority, dated Apr. 20, 2017, for PCT Application No. PCT/US2017/016593, filed Feb. 3, 2017, 7 pages.

* cited by examiner

APPARATUSES, SYSTEMS AND METHODS FOR TEMPORARY PLACEMENT OF A LIVING OBJECT ON A SEAT

CROSS REFERENCE TO RELATED APPLICATION

This application is the National Stage filing of PCT/US2017/016593, entitled "Apparatuses, Systems and Methods for Temporary Placement of a Living Object on a Seat", with the International Filing Date of Feb. 3, 2017, which claims the priority benefit of U.S. Provisional Patent Application No. 62/291,370, filed Feb. 4, 2016, the contents of which are incorporated by reference herein in their entirety for all purposes.

TECHNICAL FIELD

The present disclosure relates generally to the field of seating accessories, and more particularly, to apparatuses, systems and methods for temporary placement of a living object on a seat.

BACKGROUND

Many seating accessories are intended to protect the seats, not the objects placed on the seats. Usually in the form of seat covers, they are also intended to be put on the seats for an extended period of time, and are cumbersome to be installed on the seats, or removed from the seats, or carried around. As a result, very few seating accessories are intended for temporary placement of a living object on a seat.

Temporary placement of a living object on a seat is very important on many occasions, changing the diaper of a child being one such occasion, which can be a challenge at home, let alone when on the road, or anytime the parent/caretaker is away from more permanent diaper changing stations. The problem is especially acute when the parent/caretaker is traveling with the child in a car. Even though many retail outlets have diaper changing stations, the entire diaper changing process can take a long time: the parent must first find the retailer, park the car, unload the car seat/stroller, pack the uncooperative child into the stroller, and then proceed into the retailer in order to change the child. In addition, if the parent has more than one child, it becomes difficult to be forced to move both children out of the car in order to take care of one child's diaper. This becomes especially difficult if the other child is sleeping: the parent would have to wake up that child to take both children out of the car to do a diaper change. Further still, there is the problem of hygiene. Notwithstanding the best intentions of a parent or retailer, the public restroom can be a festering cauldron of bacteria and other potential diseases and sources of infection. Therefore, there is a need for an apparatus that allows temporary placement of a child on a convenient seat (e.g., a seat in one's own car) and changing the child's diaper on the seat.

Changing an infant in a car is not impossible, but there are at least three main problems parents face when trying to do this without the aid of some apparatus. Primarily, most car seats are "bucket" style (i.e., the rearmost portion of the seat is lower than that of the front portion) such that the car seat angles downward at the backrest, causing the child to roll over. This makes the task of changing a diaper difficult, especially when the infant's neck is not yet strong, because the face of the infant can get pressed against the backrest. In addition, when the legs of the child get stronger, they typically push against the waist of the parent or struggle with the parent, causing the child to push their heads into the seatbelt buckle, console, or even worse, the infant car seat base, which is typically positioned in the center of the back or rear seats. Furthermore, when the child reaches teething/grabbing age, it becomes increasingly difficult to change a diaper without distraction.

There have been attempts to provide a substantially level and horizontal surface upon which to change an infant's diapers, such as the cushions disclosed in U.S. Pat. No. 5,852,838 for use with sloped vehicle seats. However, such attempts cannot fully solve all of the problems with in-car diaper changing described above. In addition, because the angle provided by such cushions is fixed, they are not versatile and can only work with vehicle seats with a "matching" slope. Furthermore, the cushions need a separate storage space in the car and, unless covered or put in another bag, are unsightly to carry around.

SUMMARY OF THE DISCLOSURE

An embodiment of the disclosure provides a foldable apparatus for temporary placement of a living object on a seat comprising a surface and a back. The foldable apparatus comprises:
  a pad layer comprising a first panel defining a perimeter and including a first edge, wherein the living object is placed on the first panel of the pad layer when the foldable apparatus is unfolded and the pad layer is positioned substantially horizontally on the surface of the seat; and
  a back layer foldably connected to the pad layer along the first edge, the back layer comprising one or more straps configured to attach the back layer to the back of the seat,
  wherein one or both of the pad layer and the back layer comprise a first connector configured to secure the pad layer and the back layer to each other thereby keeping the foldable apparatus in a folded configuration, and to allow unfolding of the foldable apparatus with one-hand operation.

Another embodiment of the present disclosure provides a system for temporary placement of a living object. The system comprises:
  a seat comprising a surface and a back, and
  an unfolded foldable apparatus comprising
  a pad layer positioned substantially horizontally on the surface of the seat, the pad layer comprising a first panel defining a perimeter and including a first edge, and
  a back layer foldably connected to the pad layer along the first edge, the back layer comprising one or more straps configured to attach the back layer to the back of the seat,
  wherein the living object is placed on the first panel of the pad layer, and one or both of the pad layer and the back layer comprise a first connector configured to secure the pad layer and the back layer to each other thereby keeping the foldable apparatus in a folded configuration, and to allow unfolding of the foldable apparatus with one-hand operation.

Another embodiment of the present disclosure provides a method of changing a child's diaper on a seat comprising a surface and a back. The method comprises:
  attaching a foldable apparatus to the back of the seat in a folded configuration, the foldable apparatus comprising a pad layer comprising a first panel defining a perimeter and including a first edge, and a back layer foldably connected to the pad layer along the first edge, the back layer comprising one or more straps configured to attach the back layer to the back of the seat, wherein one or both of the pad layer and the back layer comprise a connector configured to secure the pad layer and the back layer to each other, thereby keeping the foldable apparatus in the folded configuration;

unfolding the foldable apparatus and placing the pad layer substantially horizontally on the surface of the seat;

placing a child on the pad layer; and changing the child's diaper.

In addition, an embodiment of the present disclosure provides a method of entertaining a child on a seat comprising a surface and a back. The method comprises:

attaching a foldable apparatus to the back of the seat in a folded configuration, the foldable apparatus comprising a pad layer comprising a first panel defining a perimeter and including a first edge, and a back layer foldably connected to the pad layer along the first edge, the back layer comprising one or more straps configured to attach the back layer to the back of the seat, a first surface that faces the pad layer when the foldable apparatus is in the folded configuration, and one or more hooks or loops on the first surface configure to hang items when the back layer is attached to the back of the seat, and to be accessible when the foldable apparatus is unfolded, and hidden when the foldable apparatus is folded, wherein one or both of the pad layer and the back layer comprise a connector configured to secure the pad layer and the back layer to each other, thereby keeping the foldable apparatus in the folded configuration;

unfolding the foldable apparatus and placing the pad layer substantially horizontally on the surface of the seat;

placing a child on the pad layer; and providing entertainment to the child by hanging at least one item of entertainment to at least one hook or loop on the first surface of the back layer.

The foldable apparatus in the embodiments can be folded when not in use while still attached to the seat, thereby restoring the normal seat function without taking extra space.

DETAILED DESCRIPTION

Figure 1:
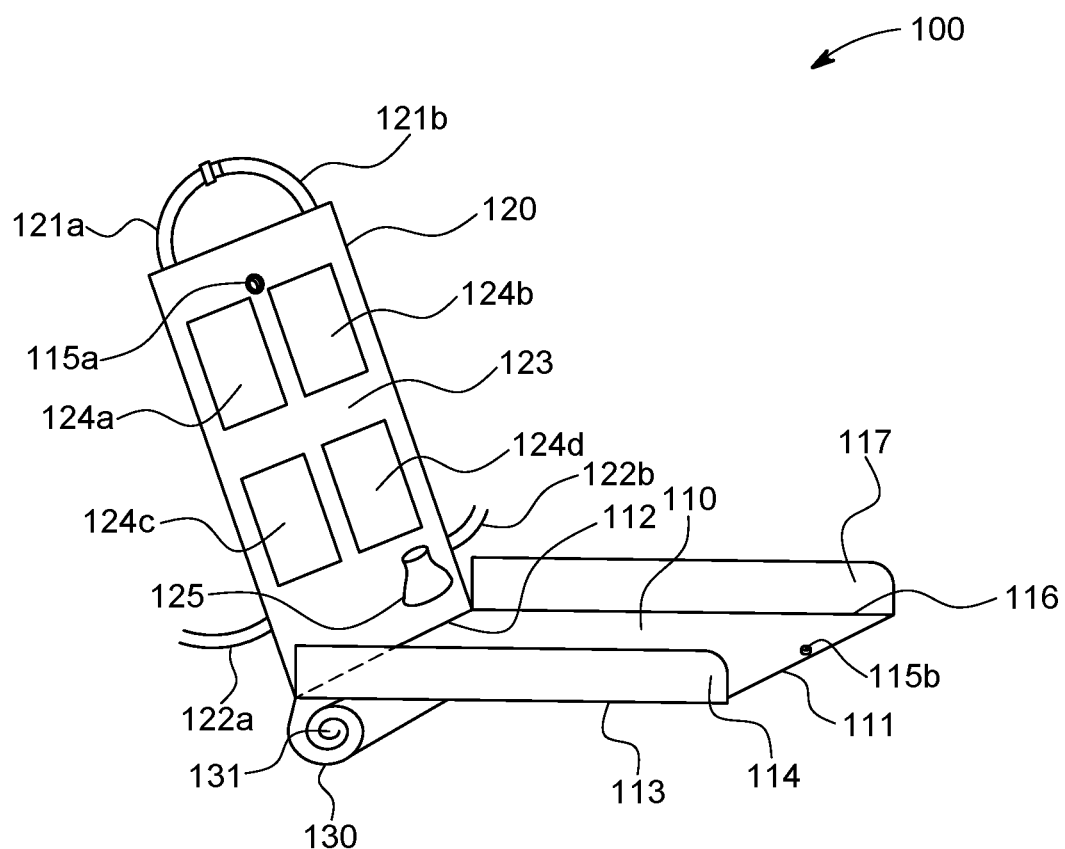
FIG. 1 is a perspective view of a foldable apparatus for temporary placement of a living object on a seat comprising a surface and a back, according to various embodiments.

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

The present disclosure relates generally to the field of seating accessories, and more particularly, to apparatuses, systems and methods for temporary placement of a living object on a seat.

As used herein, a seat refers to any object, structure or part comprising a surface for sitting or resting on that takes most or all of the weight of the person or thing sitting or resting on it, and a back that forms an angle with the surface and takes some or none of the weight of the person or thing sitting or resting on the surface. The surface may be horizontal or sloped, as long as it allows the sitting or resting of the person or thing on it, the back may be vertical or slanted, and the angle formed by the surface and the back may be 90 degrees or any other degree that allows the person or thing to sit or rest on the surface, which takes most or all of the weight of the person or thing while being seated. Examples of a seat include, but are not limited to, a chair, a bench, a sofa, a couch, etc. A seat does not need to have legs or arms, nor does it need to be movable. For example, a seat in a vehicle is an example of a seat contemplated by the present disclosure.

As used herein, a living object is any living thing that can sit or rest on a seat, either temporarily or for an extended period of time. Examples of a living object include, but are not limited to, a human being (such as a child or an adult), an animal (such as a pet), a plant, etc. Although embodiments disclosed herein may be described and illustrated herein as involving the temporary placement of a living object on a seat, it should be understood that the embodiments are not so limited, but can be additionally applicable to prolonged placement of a living object on a seat. In addition, although embodiments may be described and illustrated herein in terms of placing a single living object on a seat, it should be understood that the embodiments are not so limited, but can be additionally applicable to placing more than one or one type of living object on a same seat, whether simultaneously or otherwise. Furthermore, although embodiments disclosed herein may be described and illustrated herein as involving the temporary placement of a living object on a seat without physical contact between the seat and the living object, it should be understood that some embodiments can include physical contact between the seat and the living object, either at the surface of the seat or the back of the seat, or both. Moreover, although some embodiments disclosed herein may be described and illustrated herein as involving the interaction between the living object temporarily placed on a seat and the person placing the living object on the seat (e.g., the person changing diapers of or providing entertainment to a child placed on a seat), it should be understood that some embodiments can include no interaction between the living object temporarily placed on a seat and the person placing the living object on the seat, except for the act of placement itself.

One of the technical problems to be solved by embodiments of the present disclosure is to provide apparatuses, systems and methods for temporary placement of a living object on a seat, thereby allowing interaction with the living object while being placed on the seat. The foldable apparatus is versatile to be placed on (and easily removed from) substantially any seat with a surface and a back.

Using an apparatus to assist the temporary placement of a living object on a seat can provide advantages. For example, the foldable apparatus can prevent the contact between the seat and the living object, thereby preventing contamination of the seat by the living object, or vice versa, and/or protect the surface of the seat from being scratched by the living object. In addition, the use of an apparatus to assist the temporary placement of a living object on a seat can also restrict or limit the movement of the living object on the seat, thereby enhancing the safety of the living object when placed on the seat and/or enhancing the control of the living object by the person placing it on the seat. Any of the above advantages, either alone or in combination, can greatly enhance the experience and the ease and convenience of temporarily placing a living object on a seat.

FIG. 1 is a perspective view of a foldable apparatus 100 for temporary placement of a living object on a seat comprising a surface and a back, according to various embodiments. The foldable apparatus 100 comprises:

a pad layer 110 comprising a first panel 111 defining a perimeter and including a first edge 112, wherein the living object is placed on the first panel 111 of the pad layer 110 when the foldable apparatus 100 is unfolded and the pad layer 110 is positioned substantially horizontally on the surface of the seat; and a back layer 120 foldably connected to the pad layer 110 along the first edge 112, the back layer 120 comprising one or more straps 121a, 121b, 122a and 122b that attach the back layer 120 to the back of the seat.

According to some embodiments, the back layer can comprise a strap, the two ends of which are attached to the back layer, that forms a half loop around the back of the seat that goes through it and is bounded by it and the back layer of the foldable apparatus. According to some embodiments, the back layer can comprise one or more pairs of straps. Within each pair of straps, each strap comprises one end attached to the back layer, and the other end of each of the straps can be detachably attached to each other, thereby forming a half loop around the back of the seat that goes through it and is bounded by it and the back layer of the foldable apparatus. Mechanisms for attaching straps to the back layer or to each other are well known to those skilled in the art, and include, but are not limited to Velcro closures and parachute clips. Other examples of such mechanisms include those mechanisms applicable to the first connector or the second connector, as described in more detail further below. According to some embodiments, one or more of the straps of the present disclosure can be elastic, thereby rendering the circumference of the half loop of which such strap forms a part adjustable. The straps of the present disclosure can be made with various materials suitable for making straps and well known to those skilled in the art, e.g., nylon. According to some embodiments, the straps of the present disclosure can be made of nylon webbing with plastic side release clips of about ¾".

According to some embodiments, the back layer 120 further comprises a first surface 123 that faces the pad layer 110 when the foldable apparatus 100 is in the folded configuration and one or more pockets 124a, 124b, 124c and 124d on the first surface 123, configured to be accessible when the foldable apparatus 100 is unfolded, and hidden when the foldable apparatus 100 is folded. According to some embodiments, the back layer 120 comprises one or more hooks or loops 125 on the first surface 123 configured to hang items when the back layer 120 is attached to the back of the seat, and to be accessible when the foldable apparatus 100 is unfolded, and hidden when the foldable apparatus 100 is folded.

According to some embodiments, the first panel 111 of the pad layer 110 comprises a second edge 113 and the pad layer 110 further comprises a first side panel 114 foldably connected to the first panel 111 along the second edge 113, and the first side panel 114 is configured to be folded over the first panel 111 when the foldable apparatus 100 is folded, and forms a first barrier positioned adjacent to the first panel 111 when unfolded from the first panel 111 when the foldable apparatus 100 is in an unfolded configuration, wherein the barrier is configured to prevent the living object placed on the first panel 111 of the pad layer 110 from moving outside the perimeter when the pad layer 110 is positioned substantially horizontally on the surface of the seat. According to some embodiments, the first side panel 114 comprises a first side connector configured to connect the first side panel 114 to the back layer 120 and to, when so connected, pull the first side panel 114 away from the first panel 111 when the foldable apparatus 100 is in the unfolded configuration, thereby securing the first barrier. According to some embodiments, the first panel 111 of the pad layer 110 comprises a third edge 116 and the pad layer 110 comprises a second side panel 117 foldably connected to the first panel 111 when the foldable apparatus 100 is folded, and form a second barrier positioned adjacent to the first panel 111 when unfolded from the first panel 111 when the foldable apparatus 100 is in an unfolded configuration, wherein the barrier is configured to prevent the living object placed on the first panel 111 of the pad layer 110 from moving outside the perimeter when the pad layer 110 is positioned substantially horizontally on the surface of the seat. According to some embodiments, the second side panel comprises a second side connector configured to connect the second side panel 117 to the back layer 120 and to, when so connected, pull the second side panel 117 away from the first panel 111 when the foldable apparatus 100 is in the unfolded configuration, thereby securing the second barrier.

According to some embodiments, one or both of the pad layer 110 and the back layer 120 comprise a first connector 115a and 115b configured to secure the pad layer 110 and the back layer 120 to each other, thereby keeping the foldable apparatus 100 in a folded configuration, and to allow unfolding of the foldable apparatus 100 with one-hand operation. In the embodiments illustrated in FIG. 1, the first connector 115b on the pad layer 110 is located on the first panel 111. In other embodiments, the first connector can be located on the first side panel and/or the second side panel of the pad layer, so long as it can secure the pad layer and the back layer to each other when the foldable apparatus is folded.

According to some embodiments, the pad layer 110 and the back layer 120 are detachable from each other along the first edge 112 via a first edge connector. Such detachability can allow the pad layer and the back layer to be carried separately if needed and be cleaned individually. Such detachability can also allow the pad layer to be used alone in the absence of the back layer, e.g., on other surfaces that do not have a vertical structure such as the back of a seat. Mechanisms for detachably connecting the pad layer and the back layer to each other are well known to those skilled in the art, and include, but are not limited to, zipper along the first edge, and Velcro assemblies. Other examples of such mechanisms include those mechanisms applicable to the first connector or the second connector, as described in more detail further below.

According to some embodiments, the foldable apparatus 100 further comprises a wedge layer 130 foldably connected to the pad layer 110 along the first edge 112. According to some embodiments, one or both of the wedge layer 130 and the pad layer 110 comprise a second connector configured to secure the wedge layer 130 to the pad layer 110 when the wedge layer 130 is folded against the pad layer 110, and to allow unfolding of the wedge layer 130 from the pad layer 110 with one-hand operation. According to some embodiments, the wedge layer 130 comprises a plurality of padded sections foldably coupled to and aligned in parallel to each other and to the first edge 112 along their long axes. According to some embodiments, the pad layer is positioned along the first edge between the back layer and the wedge layer. According to some embodiments, the wedge layer 130 is configured to be pulled away from the pad layer 110 before the pad layer 110 is placed on the surface of the seat, and folded or rolled to form a support 131 to the pad layer 110 from underneath to keep the pad layer 110 substantially horizontal when placed on the surface of the seat. This is especially useful in the event the surface of the seat is angled downward toward the back of the seat, such as in a bucket seat. When supported from underneath by the folded or rolled wedge layer, the pad layer can be kept substantially horizontal when placed on the angled surface.

According to some embodiments, the pad layer 110 and the wedge layer 130 are detachable from each other along the first edge 112 via a second edge connector. Such detachability can allow the pad layer and the wedge layer to be carried separately if needed and be cleaned individually. Such detachability can also allow the pad layer to be used alone in the absence of the wedge layer, e.g., on horizontal surfaces where the support of a wedge layer is not necessary. Mechanisms for detachably connecting the pad layer and the wedge layer to each other are well known to those skilled in the art, and include, but are not limited to, zipper along the first edge, and Velcro assemblies. Other examples of such mechanisms include those mechanisms applicable to the first connector or the second connector, as described in more detail further below.

Figure 2:
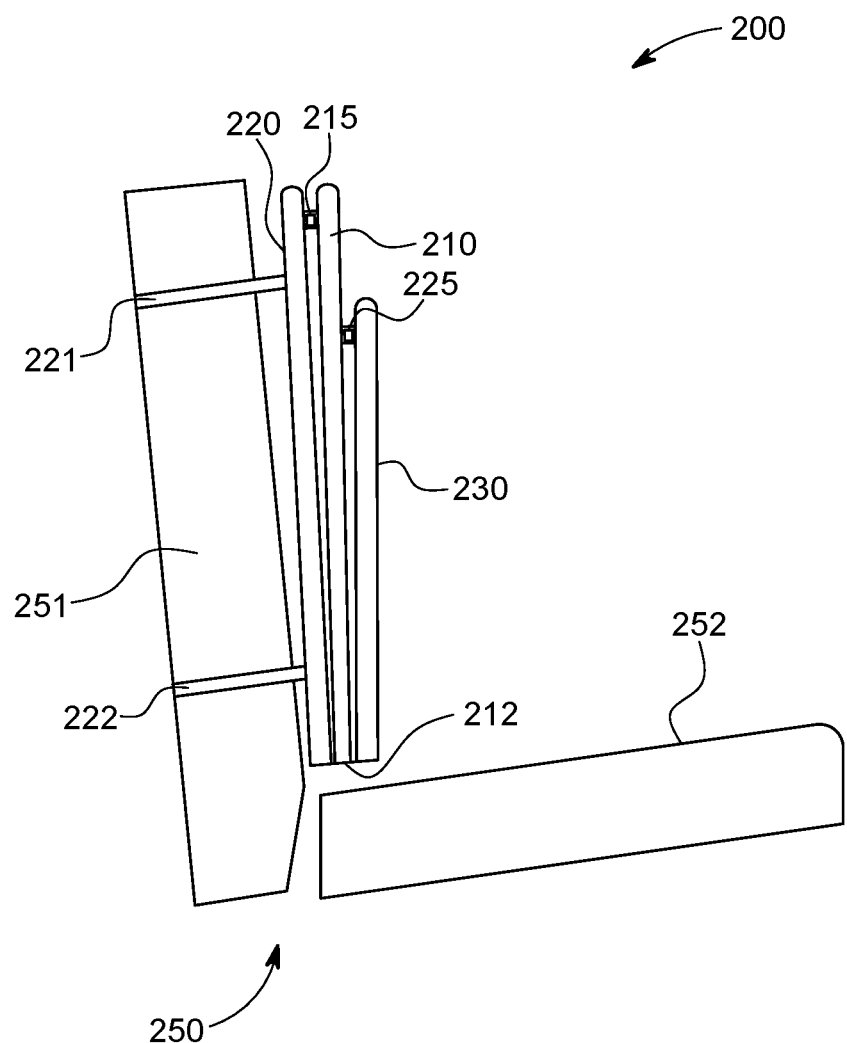
FIG. 2 is a side view of a foldable apparatus for temporary placement of a living object on a seat comprising a surface and a back, in a folded configuration against the back of the seat, according to various embodiments.

FIG. 2 is a side view of a foldable apparatus 200 for temporary placement of a living object on a seat 250 comprising a surface 252 and a back 251, in a folded configuration against the back 251 of the seat 250, according to various embodiments. According to some embodiments, a back layer 220 is foldably connected to a pad layer 210 along a first edge 212, the back layer 220 comprising one or more straps 221 and 222 that attach the back layer 220 to the back 251 of the seat 250.

According to some embodiments, one or both of the pad layer 210 and the back layer 220 comprise a first connector 215 configured to secure the pad layer 210 and the back layer 220 to each other, thereby keeping the foldable apparatus 200 in a folded configuration, and to allow unfolding of the foldable apparatus 200 with one-hand operation.

According to some embodiments, the pad layer 210 and the back layer 220 are detachable from each other along the first edge 212 via a first edge connector.

According to some embodiments, the foldable apparatus 200 further comprises a wedge layer 230 foldably connected to the pad layer 210 along the first edge 212. According to some embodiments, one or both of the pad layer 210 and the wedge layer 230 comprise a second connector 225 configured to secure the wedge layer 230 to the pad layer 210 when the wedge layer 230 is folded against the pad layer 210 and to allow unfolding of the wedge layer 230 from the pad layer 210 with one-hand operation. According to some embodiments, the wedge layer 230 comprises a plurality of padded sections foldably coupled to and aligned in parallel to each other and to the first edge 212 along their long axes. According to some embodiments, the pad layer is positioned along the first edge between the back layer and the wedge layer. According to some embodiments, the wedge layer 230 is configured to be pulled away from the pad layer 210 before the pad layer 210 is placed on the surface 252, and folded or rolled to form a support to the pad layer 210 from underneath to keep the pad layer 210 substantially horizontal when placed on the surface 252. This is especially useful in the event the surface of the seat is angled downward toward the back of the seat, such as in a bucket seat. When supported from underneath by the folded or rolled wedge layer, the pad layer can be kept substantially horizontal when placed on the angled surface.

Figure 3A:
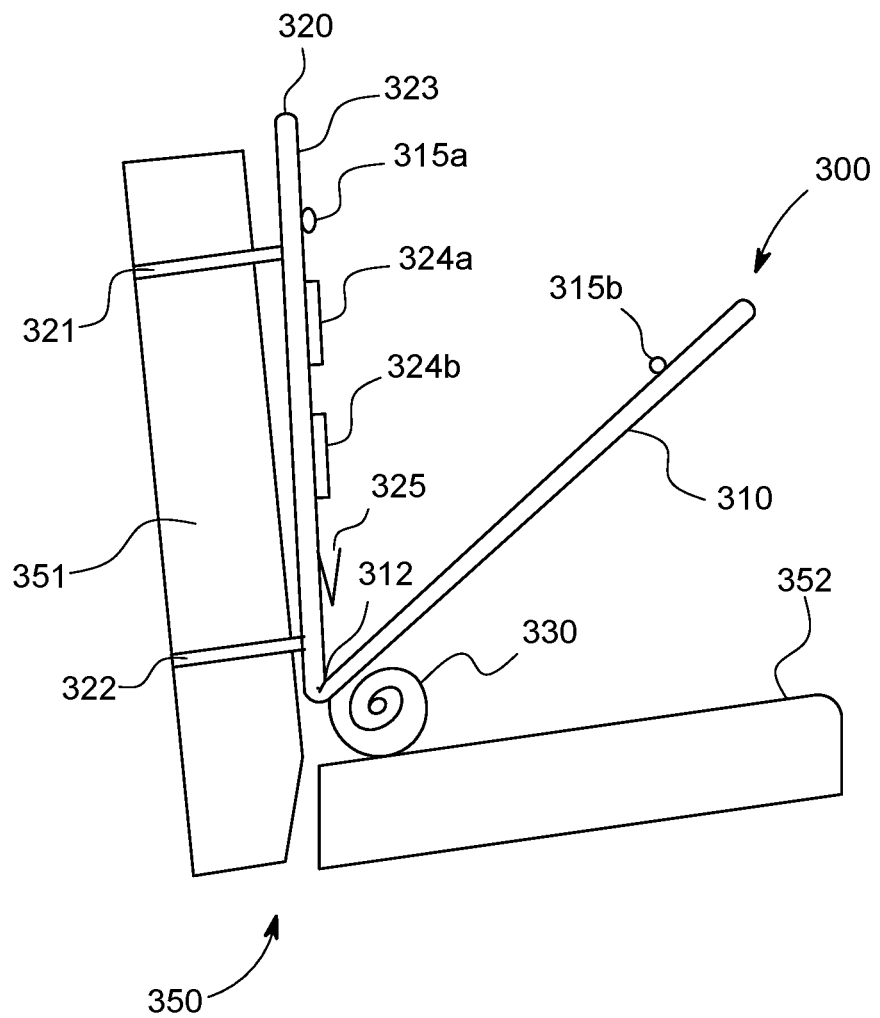
FIGS. 3A-3B are side views of a foldable apparatus for temporary placement of a living object on a seat comprising a surface and a back, illustrating examples of the folding or rolling of a wedge layer while a pad layer is being unfolded and placed on the surface of the seat, respectively, according to various embodiments.
Figure 3B:
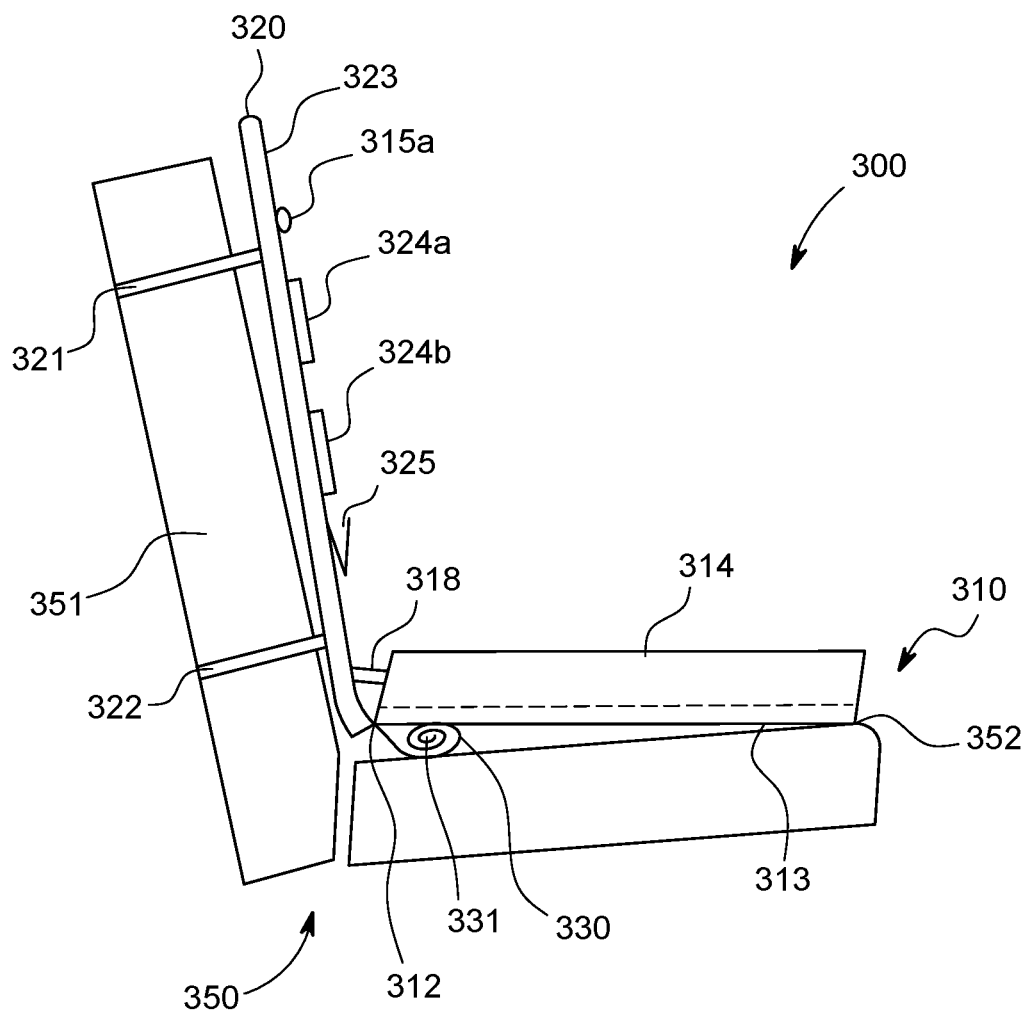

FIGS. 3A-3B are side views of a foldable apparatus 300 for temporary placement of a living object on a seat 350 comprising a surface 352 and a back 351, illustrating examples of the folding of a wedge layer 330 while a pad layer 310 is being unfolded and placed on the surface 352 of the seat 350, respectively, according to various embodiments. According to some embodiments, a back layer 320 is foldably connected to the pad layer 310 along a first edge 312, the back layer 320 comprising one or more straps 321 and 322 that attach the back layer 320 to the back 351 of the seat 350.

According to some embodiments, one or both of the pad layer 310 and the back layer 320 comprise a first connector 315a and 315b configured to secure the pad layer 310 and the back layer 320 to each other, thereby keeping the foldable apparatus 300 in a folded configuration, and to allow unfolding of the foldable apparatus 300 with one-hand operation. According to some embodiments, the back layer 320 further comprises a first surface 323 that faces the pad layer 310 when the foldable apparatus 300 is in the folded configuration and one or more pockets 324a and 324b on the first surface 323, configured to be accessible when the foldable apparatus 300 is unfolded, and hidden when the foldable apparatus 300 is folded. According to some embodiments, the back layer 320 comprises one or more hooks or loops 325 on the first surface 323 configured to hang items when the back layer 320 is attached to the back 351 of the seat 350, and to be accessible when the foldable apparatus 300 is unfolded, and hidden when the foldable apparatus 300 is folded.

According to some embodiments, the pad layer 310 comprises a first panel that comprises a second edge 313 and the pad layer 310 further comprises a first side panel 314 foldably connected to the first panel along the second edge 313, and the first side panel 314 is configured to be folded over the first panel when the foldable apparatus 300 is folded, and forms a first barrier positioned adjacent to the first panel when unfolded from the first panel when the foldable apparatus 300 is in an unfolded configuration, wherein the barrier is configured to prevent the living object placed on the first panel of the pad layer 310 from moving outside the perimeter when the pad layer 310 is positioned substantially horizontally on the surface of the seat 350. According to some embodiments, the first side panel 314 comprises a first side connector 318 configured to connect the first side panel 314 to the back layer 320 and to, when so connected, pull the first side panel 314 away from the first panel when the foldable apparatus 300 is in the unfolded configuration, thereby securing the first barrier.

According to some embodiments, the pad layer 310 and the back layer 320 are detachable from each other along the first edge 312 via a first edge connector.

According to some embodiments, the foldable apparatus 300 further comprises a wedge layer 330 foldably connected to the pad layer 310 along the first edge 312. According to some embodiments, one or both of the pad layer 310 and the wedge layer 330 comprise a second connector configured to secure the wedge layer 330 to the pad layer 310 when the wedge layer 330 is folded against the pad layer 310, and to allow unfolding of the wedge layer 330 from the pad layer 310 with one-hand operation. According to some embodiments, the wedge layer 330 comprises a plurality of padded sections foldably coupled to and aligned in parallel to each other and to the first edge 312 along their long axes. According to some embodiments, the wedge layer 330 is configured to be pulled away from the pad layer 310 before the pad layer 310 is placed on the surface 352, and folded or rolled to form a support 331 to the pad layer 310 from underneath to keep the pad layer 310 substantially horizontal when placed on the surface 352. This is especially useful in the event the surface of the seat is angled downward toward the back of the seat, such as in a bucket seat. When supported from underneath by the folded or rolled wedge layer, the pad layer can be kept substantially horizontal when placed on the angled surface.

Figure 4:
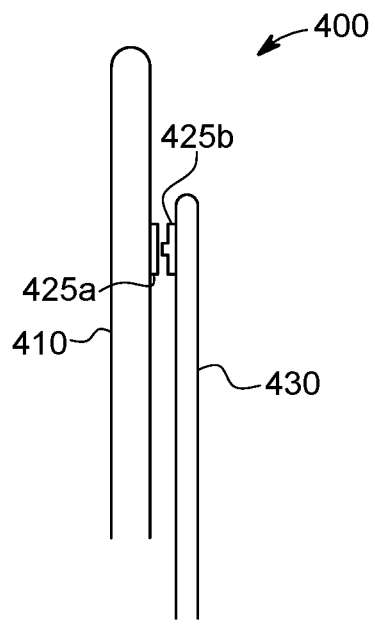
FIG. 4 is a close-up side view of a portion of a foldable apparatus for temporary placement of a living object on a seat, illustrating an example of a second connector on each of a wedge layer and a pad layer that secures the wedge layer to the pad layer when the wedge layer is folded against the pad layer and allows unfolding of the wedge layer from the pad layer with one-hand operation, according to various embodiments.

FIG. 4 is a close-up side view of a portion of a foldable apparatus 400 for temporary placement of a living object on a seat, illustrating an example of a second connector 425a and 425b on each of a pad layer 410 and a wedge layer 430, respectively, that secures the wedge 430 layer to the pad layer 410 when the wedge layer 430 is folded against the pad layer 410 and allows unfolding of the wedge layer 430 from the pad layer 410 with one-hand operation, according to various embodiments. In the example illustrated in FIG. 4, the second connector comprises a snap-button assembly. Mechanisms that can be used to connect the pad layer and the wedge layer are not limited to the example illustrated in FIG. 4 and are well known to those skilled in the art. For example, each of the pad layer and the wedge layer can include a surface of a Velcro complimentary to each other such that when the two surfaces are brought in close proximity to each other they stick together, thereby fastening the pad layer and the wedge layer together. Other examples of such mechanisms include, but are not limited to, magnetic assembly, button(s) (on one of the pad layer and the wedge layer) and button hole(s) (on the other of the pad layer and the wedge layer), string(s) on each of the pay layer and the wedge layer that can be tied to each other, and the mechanism illustrated in FIG. 5 below.

Figure 5:
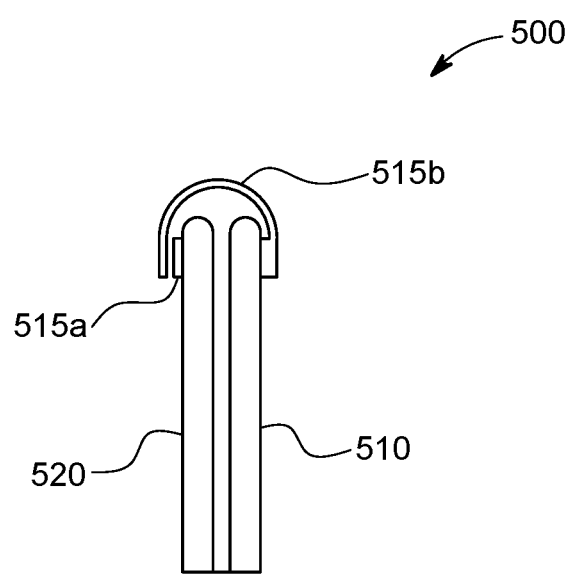
FIG. 5 is a close-up side view of a portion of a foldable apparatus for temporary placement of a living object on a seat, illustrating an example of a first connector on each of a pad layer and a back layer that secures the pad layer to the back layer when the pad layer is folded against the back layer and allows unfolding of the pad layer from the back layer with one-hand operation, according to various embodiments.

FIG. 5 is a close-up side view of a portion of a foldable apparatus 500 for temporary placement of a living object on a seat, illustrating an example of a first connector 515a and 515b on each of a back layer 520 and a pad layer 510 that secures the pad layer 510 to the back layer 520 when the pad layer 510 is folded against the back layer 520 and allows unfolding of the pad layer 510 from the back layer 520 with one-hand operation, according to various embodiments. In the example illustrated in FIG. 5, the first connector comprises a folding strap, e.g., a Velcro strap assembly. Mechanisms that can be used to connect the pad layer and the back layer are not limited to the example illustrated in FIG. 5 and are well known to those skilled in the art. For example, each of the pad layer and the back layer can include a surface of a Velcro complimentary to each other such that when the two surfaces are brought in close proximity to each other they stick together, thereby fastening the pad layer and the back layer together. Other examples of such mechanisms include, but are not limited to, magnetic assembly, button(s) (on one of the pad layer and the back layer) and button hole(s) (on the other of the pad layer and the back layer), string(s) on each of the pad layer and the back layer that can be tied to each other, and the mechanism illustrated in FIG. 4 above.

Figure 6:
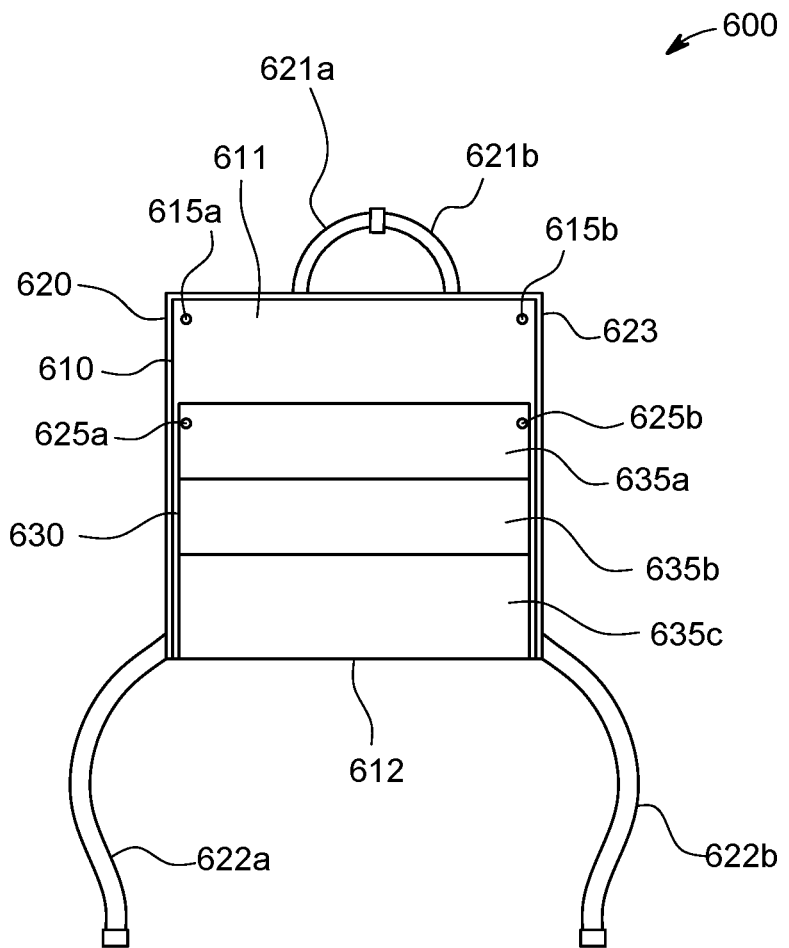
FIG. 6 is a front view of a foldable apparatus for temporary placement of a living object on a seat, in a folded configuration, according to various embodiments.

FIG. 6 is a front view of a foldable apparatus 600 for temporary placement of a living object on a seat, in a folded configuration, according to various embodiments. The foldable apparatus 600 comprises:
  a pad layer 610 comprising a first panel 611 defining a perimeter and including a first edge 612, wherein the living object is placed on the first panel 611 of the pad layer 610 when the foldable apparatus 600 is unfolded and the pad layer 610 is positioned substantially horizontally on the surface of the seat;
  a back layer 620 foldably connected to the pad layer 610 along the first edge 612, the back layer 620 comprising one or more straps 621a, 621b, 622a and 622b that attach the back layer 620 to the back of the seat; and
  a wedge layer 630 foldably connected to the pad layer 610 along the first edge 612.

According to some embodiments, one or both of the pad layer 610 and the back layer 620 comprise a first connector 615a and 615b configured to secure the pad layer 610 and the back layer 620 to each other, thereby keeping the foldable apparatus 600 in a folded configuration, and to allow unfolding of the foldable apparatus 600 with one-hand operation. According to some embodiments, the back layer 620 further comprises a first surface 623 that faces the pad layer 610 when the foldable apparatus 600 is in the folded configuration and one or more pockets on the first surface 623, configured to be accessible when the foldable apparatus 600 is unfolded, and hidden when the foldable apparatus 600 is folded. According to some embodiments, the back layer 620 comprises one or more hooks or loops on the first surface 623 configured to hang items when the back layer 620 is attached to the back of the seat, and to be accessible when the foldable apparatus 600 is unfolded, and hidden when the foldable apparatus 600 is folded.

According to some embodiments, the pad layer 610 and the back layer 620 are detachable from each other along the first edge 612 via a first edge connector.

According to some embodiments, the pad layer 610 and the wedge layer 630 are detachable from each other along the first edge 612 via a second edge connector.

According to some embodiments, one or both of the wedge layer 630 and the pad layer 610 comprise a second connector 625a and 625b configured to secure the wedge layer 630 to the pad layer 610 when the wedge layer 630 is folded against the pad layer 610 and to allow unfolding of the wedge layer 630 from the pad layer 610 with one-hand operation.

According to some embodiments, the wedge layer 630 comprises a plurality of padded sections 635a, 635b and 635c foldably coupled to and aligned in parallel to each other and to the first edge 612 along their long axes. According to some embodiments, the wedge layer 630 is configured to be pulled away from the pad layer 610 before the pad layer 610 is placed on the surface of the seat, and folded or rolled to form a support to the pad layer 610 from underneath to keep the pad layer 610 substantially horizontal when placed on the surface of the seat. This is especially useful in the event the surface of the seat is angled downward toward the back of the seat, such as in a bucket seat. When supported from underneath by the folded or rolled wedge layer, the pad layer can be kept substantially horizontal when placed on the angled surface. As illustrated in FIG. 6, the wedge layer can comprise at least three separate sections with stitching separating the sections. However, the shape or configuration of the wedge layer is not so limited. For example, the wedge layer can be a single substantially continuous piece without the sectioning, according to some embodiments, or can comprise a different number of sections, according to some other embodiments, or can have a different shape from that illustrated in FIG. 6, according to yet some other embodiments, so long as the wedge layer can be folded or rolled to form a support to the pad layer from underneath to keep the pad layer substantially horizontal when placed on an angled surface. Stitching is but one example of a mechanism to separate the sections of a wedge layer, and other mechanisms for such separation are well known to those skilled in the art. According to some embodiments, each section of the wedge layer or the entire wedge layer (in the event it is a single substantially continuous piece) can be filled with a batting material. Other materials that can be used to fill the sections of the wedge layer or the entire wedge layer (in the event it is a single substantially continuous piece) are well known to those skilled in the art, so long as the materials have sufficient substance and can provide substantial structural integrity to the wedge layer when folded or rolled to provide support to the pad layer from underneath. According to some preferred embodiments, the padding materials are non-toxic to the living thing intended to be placed on a seat using the foldable apparatus of the present disclosure. According to some embodiments, the wedge layer or each section thereof can comprise a cover made of fleece. Other materials that can be used to cover the wedge layer or each section thereof are well known to those skilled in the art. According to some embodiments, each section can be about 5" in width.

The wedge layer of the present disclosure provides a foldable or rollable wedge, the height of which is adjustable, that can be used to provide support to and keep the pad layer of the present invention substantially horizontal on substantially any type of seat with any sloped or angled surface or any bucket seat. Those skilled in the art and users of the foldable apparatus of the present disclosure will readily appreciate that by folding or rolling the wedge layer of the present disclosure to different extents, the wedge layer of the foldable apparatus of the present disclosure can be folded or rolled to substantially fit seat gaps of different depths. For example, if the surface of the seat is horizontal, the wedge layer need not be folded open and can remain connected to the pad layer through the second connector when the pad layer is being folded open and away from the back layer and placed on the surface of the seat. According to those embodiments where the wedge layer and the pad layer are detachable from each other, before using the foldable apparatus of the present disclosure on seats with horizontal surfaces, the wedge layer can also be detached from the pad layer (and thus the foldable apparatus) and tucked away for stowage. If the surface of the seat is slightly angled down toward the back of the seat, the wedge layer can be folded open and away from the pad layer and only the sections or portions close to the first edge are folded or rolled (for example, only sections 635b and 635c are folded or rolled against each other, in the embodiments illustrated in FIG. 6) to provide a wedge with relatively low height. If the surface of the seat has a deeper slope, all sections of the wedge layer (or the entire wedge layer in the event it is a substantially continuous piece) can be folded or rolled to form the wedge, which can provide a higher support for the pad layer and keep it substantially horizontal.

According to the embodiments illustrated in FIG. 6, the pad layer and the back layer are of similar sizes, the back layer being illustrated to be slightly larger than the pad layer to reveal the back layer in the front view of the foldable apparatus in FIG. 6. However, the relative sizes of the pad layer and the back layer are not so limited, and can change in accordance with, for example, the sizes of the surface and the back of the seat, respectively, the size of the items intended to be put in the pockets or on the hooks or loops on the first surface of the back layer, or the size of the living objects intended to be placed on the first panel of the pad layer when the foldable apparatus is unfolded and the pad layer is placed on the surface of the seat. According to the embodiments illustrated in FIG. 6, each of the pad layer and the back layer is rectangular in shape. However, the shapes of the pad layer and the back layer are not so limited, and can change in accordance with, for example, the shape of the surface and the back of the seat, respectively.

According to the embodiments illustrated in FIG. 6, the pad layer and the wedge layer are of similar sizes, the pad layer being illustrated to be slightly larger than the wedge layer to reveal the pad layer in the front view of the foldable apparatus in FIG. 6. However, the relative sizes of the pad layer and the wedge layer are not so limited. For example, the wedge layer can be smaller in size than the pad layer, so long as, when it is folded or rolled in accordance with various embodiments of the present disclosure, it can provide sufficient support to the pad layer underneath the pad layer to keep the pad layer in a substantially horizontal position when placed on an angled surface of a seat. According to the embodiments illustrated in FIG. 6, each of the pad layer and the wedge layer is rectangular in shape. However, the shapes of the pad layer and the back layer are not so limited. For example, the wedge layer can be in any shape well known to those skilled in the art, so long as, when it is folded or rolled in accordance with various embodiments of the present disclosure, it can provide sufficient support to the pad layer underneath the pad layer to keep the pad layer in a substantially horizontal position when placed on an angled surface of a seat.

Figure 7:
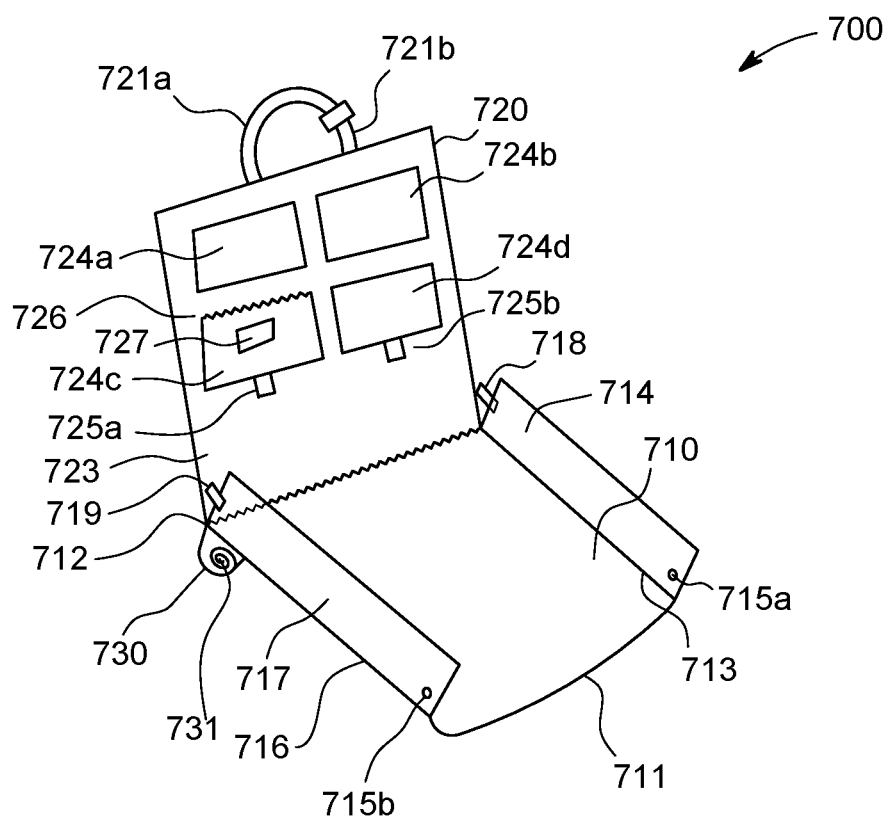
FIG. 7 is a perspective view of a foldable apparatus for temporary placement of a living object on a seat comprising a surface and a back, according to various embodiments.

FIG. 7 is a perspective view of a foldable apparatus 700 for temporary placement of a living object on a seat comprising a surface and a back, according to various embodiments. The foldable apparatus 700 comprises:

a pad layer 710 comprising a first panel 711 defining a perimeter and including a first edge, wherein the living object is placed on the first panel 711 of the pad layer 710 when the foldable apparatus 700 is unfolded and the pad layer 710 is positioned substantially horizontally on the surface of the seat; and a back layer 720 foldably connected to the pad layer 710 along the first edge, the back layer 720 comprising one or more straps 721a and 721b that attach the back layer 720 to the back of the seat.

According to some embodiments, the back layer 720 further comprises a first surface 723 that faces the pad layer 710 when the foldable apparatus 700 is in the folded configuration and one or more pockets 724a, 724b, 724c and 724d on the first surface 723, configured to be accessible when the foldable apparatus 700 is unfolded, and hidden when the foldable apparatus 700 is folded. According to the embodiments illustrated in FIG. 7, the pockets 724a, 724b, 724c and 724d on the first surface 723 are each rectangular. However, the pockets on the first surface may take any shape suitable for the function of holding items therein. Pocket designs, including shapes, dimensions and depths, are well known to those skilled in the art, and may be adjusted depending on the items intended to be held by the pocket. For example, if a pocket is intended to hold tissues, wet wipes or diapers, the pocket can be designed to have a shape that matches the tissues, wet wipes, or diapers, as applicable, and a size that is slightly larger than the item it is intended to hold. Additionally, to reduce the frequency of refilling the pocket with supplies of tissues, wet wipes, or diapers, as applicable, the pocket can have a depth deep enough to hold sufficient number of the item it is intended to hold to supply for a whole day's use, for example. According to the embodiments illustrated in FIG. 7, one pocket 724c on the first surface 723 has a zipper opening 726 that can close the pocket 724c to prevent the items held in the pocket 724c from falling out of the pocket 724c. A pocket on the first surface may not have any closure mechanism, or have another closure mechanism well known to those skilled in the art, for example, a flap cover, with or without button and button hole, a snap button assembly, a magnetic button assembly, a Velcro assembly, etc. According to the embodiments illustrated in FIG. 7, one pocket 724c on the first surface 723 has a cut-out opening 727 in the center. Cut-out opening designs are well known to those skilled in the art, and can be applied to pockets to facilitate easy and convenient retrieval of the content of a pocket, especially when it is desirable to avoid repeated opening of the pocket, for example, to avoid or reduce contamination of the content of the pocket. Such designs are frequently seen in containers or bags of tissues and wet wipes, and can be applied to the foldable apparatus of the present disclosure by those skilled in the art. For example, the cut-out opening of a pocket of the present disclosure can be made of plastic and constitute an insert for wet wipes, and a refillable wet wipes container with a plastic or rubber cover for access can be put in the pocket such that through the cut-out opening of the pocket the cover of the wet wipe container can be opened and closed and the wet wipes within the container can be retrieved. According to some embodiments, a pocket that contains a wet wipe refillable case dispenser can measure 8.75"×5"×1.5". Materials for pockets of the present disclosure, such as nylon, are well known to those skilled in the art, and can be chosen in accordance with the intended content of the pockets. According to some embodiments, one or more pockets on the foldable apparatus of the present disclosure can be a mesh pocket. According to some other embodiments, one or more pockets on the foldable apparatus of the present disclosure can comprise a transparent material so that a user of the foldable apparatus can see the content of the pocket through such material when using the foldable apparatus. According to the embodiments illustrated in FIG. 7, the pockets 724a, 724b, 724c, and 724d on the first surface of the back panel are of similar sizes. Those skilled in the art will readily appreciate that the pockets can be designed to be of different sizes in accordance with the content intended to be held by the pockets. Accordingly, different sized zippers can be used to provide closure to the pockets. For example, a #3 zipper can be used for opening access to a pocket that contains a wet wipes refillable case dispenser.

According to some embodiments, the back layer 720 comprises one or more hooks or loops 725a and 725b on the first surface 723 configured to hang items when the back layer 720 is attached to the back of the seat, and to be accessible when the foldable apparatus 700 is unfolded, and hidden when the foldable apparatus 700 is folded.

According to some embodiments, the first panel 711 of the pad layer 710 comprises a second edge 713 and the pad layer 710 further comprises a first side panel 714 foldably connected to the first panel 711 along the second edge 713, and the first side panel 714 is configured to be folded over the first panel 711 when the foldable apparatus 700 is folded, and forms a first barrier positioned adjacent to the first panel 711 when unfolded from the first panel 711 when the foldable apparatus 700 is in an unfolded configuration, wherein the barrier is configured to prevent the living object placed on the first panel 711 of the pad layer 710 from moving outside the perimeter when the pad layer 710 is positioned substantially horizontally on the surface of the seat. According to some embodiments, the first side panel 714 comprises a first side connector 718 configured to connect the first side panel 714 to the back layer 720 and to, when so connected, pull the first side panel 714 away from the first panel 711 when the foldable apparatus 700 is in the unfolded configuration, thereby securing the first barrier. According to some embodiments, the first panel 711 of the pad layer 710 comprises a third edge 716 and the pad layer 710 comprises a second side panel 717 foldably connected to the first panel 711 when the foldable apparatus 700 is folded, and form a second barrier positioned adjacent to the first panel 711 when unfolded from the first panel 711 when the foldable apparatus 700 is in an unfolded configuration, wherein the barrier is configured to prevent the living object placed on the first panel 711 of the pad layer 710 from moving outside the perimeter when the pad layer 710 is positioned substantially horizontally on the surface of the seat. According to some embodiments, the second side panel comprises a second side connector 719 configured to connect the second side panel 717 to the back layer 720, and to, when so connected, pull the second side panel 717 away from the first panel 711 when the foldable apparatus 700 is in the unfolded configuration, thereby securing the second barrier.

According to the embodiments illustrated in FIG. 7, the first side connector 718 and the second side connector 719 each take the form of a Velcro strap to connect the first side panel 714 and the second side panel 717, respectively, to the back layer 720. Other mechanisms to connect the first side panel and/or the second side panel to the back layer are well known to those skilled in the art, and include, but are not limited to, those mechanisms described above in connection with the first connector and the second connector.

According to some embodiments, one or both of the pad layer 710 and the back layer 720 comprise a first connector 715a and 715b configured to secure the pad layer 710 and the back layer 720 to each other, thereby keeping the foldable apparatus 700 in a folded configuration, and to allow unfolding of the foldable apparatus 700 with one-hand operation. According to the embodiments illustrated in FIG. 7, the first connector 715a and 715b are located on the first side panel 714 and the second side panel 717, respectively. In other embodiments, the first connector can be located on the first panel of the pad layer, so long as it can secure the pad layer and the back layer to each other when the foldable apparatus is folded.

According to some embodiments, the pad layer 710 and the back layer 720 are detachable from each other along the first edge via a first edge connector 712. As illustrated in FIG. 7, the first edge connector 712 comprises a zipper mechanism to detach the pad layer and the back layer from each other. According to some embodiments, the first edge connector can comprise a 18" separating zipper that separates the pad layer from the back layer. Other mechanisms of detachable connection are well known to those skilled in the art and include, but are not limited to, those mechanisms described above in connection with the first connector and the second connector. The mechanism of detachable connection need not be applied along the entire length of the first edge. For example, one or more buttons and corresponding button holes on the pad layer and the back layer, respectively, or vice versa, or a few snap button assemblies, or a few magnetic assemblies, in each case located along the first edge, can be used to detachably connect the pad layer to the back layer.

According to some embodiments, the foldable apparatus 700 further comprises a wedge layer 730 foldably connected to the pad layer 710 along the first edge. According to some embodiments, one or both of the wedge layer 730 and the pad layer 710 comprise a second connector configured to secure the wedge layer 730 to the pad layer 710 when the wedge layer 730 is folded against the pad layer 710, and to allow unfolding of the wedge layer 730 from the pad layer 710 with one-hand operation. According to some embodiments, the wedge layer 730 comprises a plurality of padded sections foldably coupled to and aligned in parallel to each other and to the first edge along their long axes. According to some embodiments, the wedge layer 730 is configured to be pulled away from the pad layer 710 before the pad layer 710 is placed on the surface of the seat, and folded or rolled to form a support 731 to the pad layer 710 from underneath to keep the pad layer 710 substantially horizontal when placed on the surface of the seat. This is especially useful in the event the surface of the seat is angled downward toward the back of the seat, such as in a bucket seat. When supported from underneath by the folded or rolled wedge layer, the pad layer can be kept substantially horizontal when placed on the angled surface.

According to some embodiments, the pad layer 710 and the wedge layer 730 are detachable from each other along the first edge via a second edge connector. Mechanisms of detachable connection are well known to those skilled in the art, some of which have been described above in relation to the detachable connection between the pad layer and the back layer.

Figure 8:
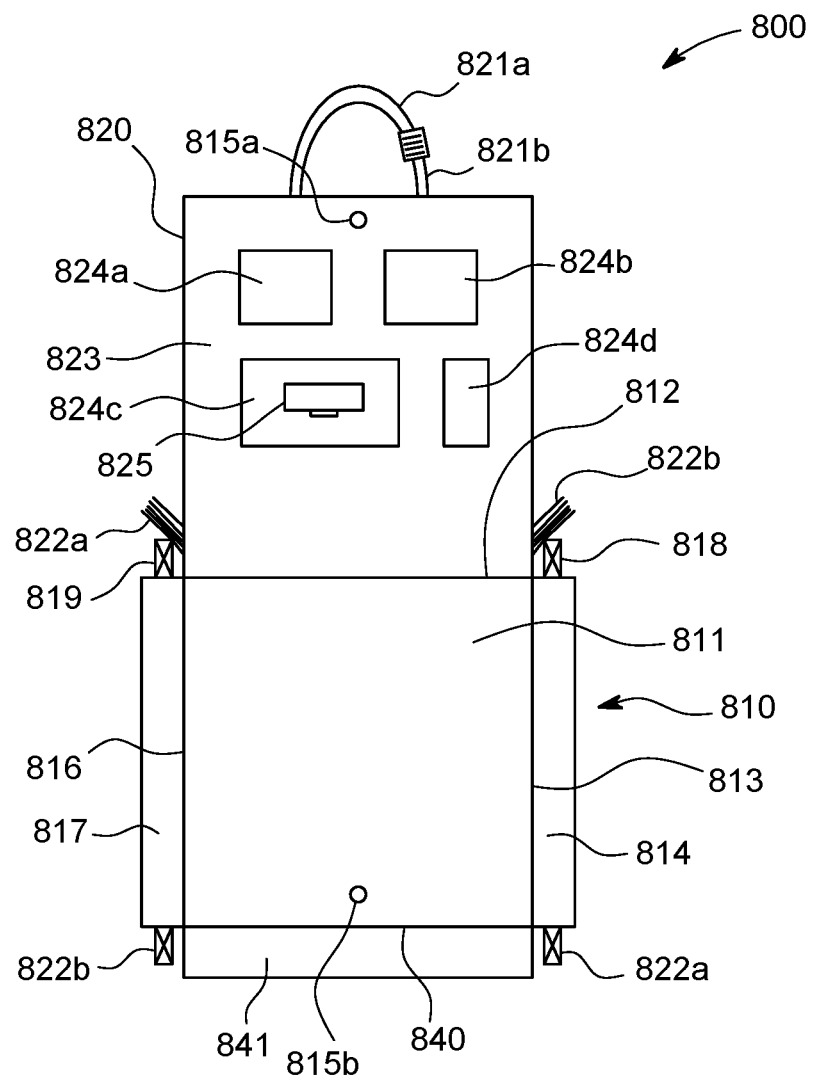
FIG. 8 is a front view of a foldable apparatus for temporary placement of a living object on a seat, in a completely unfolded configuration, according to various embodiments.

FIG. 8 is a front view of a foldable apparatus 800 for temporary placement of a living object on a seat, in a completely unfolded configuration, according to various embodiments. The foldable apparatus 800 comprises:

a pad layer 810 comprising a first panel 811 defining a perimeter and including a first edge 812, wherein the living object is placed on the first panel 811 of the pad layer 810 when the foldable apparatus 800 is unfolded and the pad layer 810 is positioned substantially horizontally on the surface of the seat; and a back layer 820 foldably connected to the pad layer 810 along the first edge 812, the back layer 820 comprising one or more straps 821a, 821b, 822a and 822b that attach the back layer 820 to the back of the seat.

According to some embodiments, the back layer 820 further comprises a first surface 823 that faces the pad layer 810 when the foldable apparatus 800 is in the folded configuration and one or more pockets 824a, 824b, 824c and 824d on the first surface 823, configured to be accessible when the foldable apparatus 800 is unfolded, and hidden when the foldable apparatus 800 is folded. According to the embodiments illustrated in FIG. 8, the pockets 824a, 824b, 824c and 824d on the first surface 823 are each rectangular. However, the pockets on the first surface may take any shape suitable for the function of holding items therein. According to the embodiments illustrated in FIG. 8, one pocket 824c on the first surface 823 has a cut-out opening in the center and a flip lid 825 that covers the cut-out opening and can be flipped open to reveal the cut-out opening, thereby allowing convenient retrieval of the content of the pocket 824c through the cut-out opening. Cut-out opening designs with flip lids are well known to those skilled in the art, and can be applied to pockets to facilitate easy and convenient retrieval of the content of a pocket, especially when it is desirable to avoid repeated opening of the pocket, for example, to avoid or reduce contamination of the content of the pocket. Such designs are frequently seen in containers or bags of tissues and wet wipes, and can be applied to the foldable apparatus of the present disclosure by those skilled in the art. For example, the cut-out opening of a pocket of the present disclosure can be made of plastic and constitute an insert for wet wipes, and a refillable wet wipes container with a plastic or rubber cover for access can be put in the pocket such that through the cut-out opening of the pocket the cover of the wet wipe container can be opened and closed and the wet wipes within the container can be retrieved. The flip lid 825 can also be made of plastic or other suitable materials well known to those skilled in the art. According to the embodiments illustrated in FIG. 8, the pockets 824a, 824b, 824c, and 824d on the first surface of the back panel are of different sizes. Those skilled in the art will readily appreciate that the pockets can be designed to be of similar sizes or different sizes in accordance with the content intended to be held by the pockets. Accordingly, different sized zippers can be used to provide closure to the pockets. For example, according to the embodiments illustrated in FIG. 8, pocket 824c can be a pocket intended to hold wet wipes. Accordingly, pocket 824c has a shape that matches the wet wipes, and a size that is slightly larger than the wet wipes it is intended to hold.

According to some embodiments, the back layer 820 comprises one or more hooks or loops on the first surface 823 configured to hang items when the back layer 820 is attached to the back of the seat, and to be accessible when the foldable apparatus 800 is unfolded, and hidden when the foldable apparatus 800 is folded.

According to some embodiments, the first panel 811 of the pad layer 810 comprises a second edge 813 and the pad layer 810 further comprises a first side panel 814 foldably connected to the first panel 811 along the second edge 813, and the first side panel 814 is configured to be folded over the first panel 811 when the foldable apparatus 800 is folded, and forms a first barrier positioned adjacent to the first panel 811 when unfolded from the first panel 811 when the foldable apparatus 800 is in an unfolded configuration, wherein the barrier is configured to prevent the living object placed on the first panel 811 of the pad layer 810 from moving outside the perimeter when the pad layer 810 is positioned substantially horizontally on the surface of the seat. According to some embodiments, the first side panel 814 comprises a first side connector 818 configured to connect the first side panel 814 to the back layer 820 and to, when so connected, pull the first side panel 814 away from the first panel 811 when the foldable apparatus 800 is in the unfolded configuration, thereby securing the first barrier. According to some embodiments, the first panel 811 of the pad layer 810 comprises a third edge 816 and the pad layer 810 comprises a second side panel 817 foldably connected to the first panel 811 when the foldable apparatus 800 is folded, and form a second barrier positioned adjacent to the first panel 811 when unfolded from the first panel 811 when the foldable apparatus 800 is in an unfolded configuration, wherein the barrier is configured to prevent the living object placed on the first panel 811 of the pad layer 810 from moving outside the perimeter when the pad layer 810 is positioned substantially horizontally on the surface of the seat. According to some embodiments, the second side panel 817 comprises a second side connector 819 configured to connect the second side panel 817 to the back layer 820, and to, when so connected, pull the second side panel 817 away from the first panel 811 when the foldable apparatus 800 is in the unfolded configuration, thereby securing the second barrier. According to some embodiments, the first panel 811 of the pad layer 810 comprises a fourth edge 840 and the pad layer 810 comprises a third side panel 841 foldably connected to the first panel 811 when the foldable apparatus 800 is folded, and form a third barrier positioned adjacent to the first panel 811 when unfolded from the first panel 811 when the foldable apparatus 800 is in an unfolded configuration, wherein the barrier is configured to prevent the living object placed on the first panel 811 of the pad layer 810 from moving outside the perimeter when the pad layer 810 is positioned substantially horizontally on the surface of the seat. According to the embodiments illustrated in FIG. 8, the first side panel 814 and the second side panel 817 each comprise a side connector 822a and 822b, respectively, configured to connect the third side panel 841 to each of the first side panel 814 and the second side panel 817, respectively, and to, when so connected, and when the first side panel 814 and the second side panel 817 are pulled away from the first panel 811, pull the third side panel 821 away from the first panel 811 when the foldable apparatus 800 is in the unfolded configuration, thereby, securing the third barrier. According to the embodiments illustrated in FIG. 8, the first panel 811 is quadrangle, and the first barrier, the second barrier and the third barrier, each when secured, form a complete enclosure along the perimeter of the first panel 811 bounded by the first barrier, the second barrier, the third barrier and the back layer 820 when the back layer 820 is attached to the back of the seat and the pad layer 810 is placed substantially horizontally on the surface of the seat. Those skilled in the art will readily appreciate, however, that the first panel of the pad layer can take other shapes, and the side panels, when pulled away from the first panel and secured, by being connected to the back layer and/or to each other, can form intermittent or continuous barriers along the perimeter of the first panel.

According to some embodiments, one or more of the side panels of the present disclosure are padded and provide padded borders to the first panel when they are pulled away from the first panel and form barriers along the edges of the first panel. Such padded borders can provide protection to the living object placed on the first panel and function as a cushion in the event the living object bumps into any of the padded side panels. This is especially helpful in situations where there are hard objects near the seat on which the foldable apparatus is placed, e.g., when the foldable apparatus is placed on a car seat, the car seat is close to the seatbelt buckle and/or the center console and, without the protection of the padded side panels, the living object may bump into these hard objects. Those skilled in the art can design the height of the side panels when pulled away from the first panel in accordance with the size of the living object intended to be placed on the first panel so that the side panels can provide sufficient cushion area and adequate protection to the living object placed on the first panel. According to some embodiments, each side panel, when pulled away from the first panel, is about 4 inches high. According to some other embodiments, each side panel, when pulled away from the first panel, is at least 4 inches high. In order to provide shape to the side panels so they can easily remain in standing position when pulled away from the first panel, the side panels can be filled with a foam material or other materials well known to those skilled in the art that can give shape to the side panels.

According to some embodiments, one or both of the pad layer 810 and the back layer 820 comprise a first connector 815a and 815b configured to secure the pad layer 810 and the back layer 820 to each other, thereby keeping the foldable apparatus 800 in a folded configuration, and to allow unfolding of the foldable apparatus 800 with one-hand operation. In the embodiments illustrated in FIG. 8, the first connector 815b on the pad layer 810 is located on the first panel 811. In other embodiments, the first connector can be located on the first side panel, the second side panel, the third side panel, and/or any other side panel of the pad layer, so long as it can secure the pad layer and the back layer to each other when the foldable apparatus is folded.

According to some embodiments, the pad layer 810 and the back layer 820 are detachable from each other along the first edge 812 via a first edge connector.

According to some embodiments, the foldable apparatus 800 further comprises a wedge layer foldably connected to the pad layer 810 along the first edge 812. According to some embodiments, one or both of the wedge layer and the pad layer 810 comprise a second connector configured to secure the wedge layer to the pad layer 810 when the wedge layer is folded against the pad layer 810, and to allow unfolding of the wedge layer from the pad layer 810 with one-hand operation. According to some embodiments, the wedge layer comprises a plurality of padded sections foldably coupled to and aligned in parallel to each other and to the first edge 812 along their long axes. According to some embodiments, the wedge layer is configured to be pulled away from the pad layer 810 before the pad layer 810 is placed on the surface of the seat, and folded or rolled to form a support to the pad layer 810 from underneath to keep the pad layer 810 substantially horizontal when placed on the surface of the seat. This is especially useful in the event the surface of the seat is angled downward toward the back of the seat, such as in a bucket seat. When supported from underneath by the folded or rolled wedge layer, the pad layer can be kept substantially horizontal when placed on the angled surface.

According to some embodiments, the pad layer 810 and the wedge layer are detachable from each other along the first edge 812 via a second edge connector.

Figure 9:
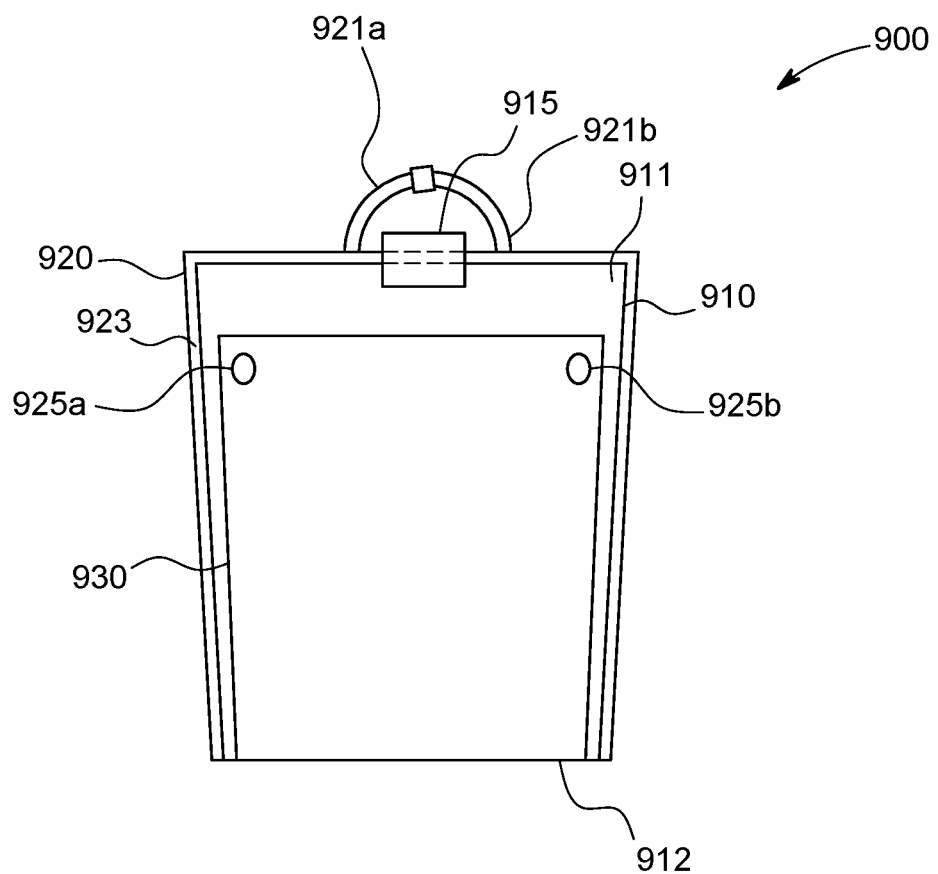
FIG. 9 is a front view of a foldable apparatus for temporary placement of a living object on a seat, in a folded configuration, according to various embodiments.

FIG. 9 is a front view of a foldable apparatus 900 for temporary placement of a living object on a seat, in a folded configuration, according to various embodiments. The foldable apparatus 900 comprises:
- a pad layer 910 comprising a first panel 911 defining a perimeter and including a first edge 912, wherein the living object is placed on the first panel 911 of the pad layer 910 when the foldable apparatus 900 is unfolded and the pad layer 910 is positioned substantially horizontally on the surface of the seat;
- a back layer 920 foldably connected to the pad layer 910 along the first edge 912, the back layer 920 comprising one or more straps 921a and 921b that attach the back layer 920 to the back of the seat; and
- a wedge layer 930 foldably connected to the pad layer 910 along the first edge 912.

According to some embodiments, one or both of the pad layer 910 and the back layer 920 comprise a first connector 915 configured to secure the pad layer 910 and the back layer 920 to each other, thereby keeping the foldable apparatus 900 in a folded configuration, and to allow unfolding of the foldable apparatus 900 with one-hand operation. According to the embodiments illustrated in FIG. 9, the first connector 915 can be a folding strap, e.g., a Velcro strap. Mechanisms that can be used to connect the pad layer and the back layer are well known to those skilled in the art, and include, but are not limited to the examples described in connection with FIG. 5 above.

According to some embodiments, the back layer 920 further comprises a first surface 923 that faces the pad layer 910 when the foldable apparatus 900 is in the folded configuration and one or more pockets on the first surface 923, configured to be accessible when the foldable apparatus 900 is unfolded, and hidden when the foldable apparatus 900 is folded. According to some embodiments, the back layer 920 comprises one or more hooks or loops on the first surface 923 configured to hang items when the back layer 920 is attached to the back of the seat, and to be accessible when the foldable apparatus 900 is unfolded, and hidden when the foldable apparatus 900 is folded.

According to some embodiments, the pad layer 910 and the back layer 920 are detachable from each other along the first edge 912 via a first edge connector.

According to some embodiments, the pad layer 910 and the wedge layer 930 are detachable from each other along the first edge 912 via a second edge connector.

According to some embodiments, one or both of the wedge layer 930 and the pad layer 910 comprise a second connector 925a and 925b that secures the wedge layer 930 to the pad layer 910 when the wedge layer 930 is folded against the pad layer 910 and allows unfolding of the wedge layer 930 from the pad layer 910 with one-hand operation.

According to some embodiments, the wedge layer 930 comprises a plurality of padded sections foldably coupled to and aligned in parallel to each other and to the first edge 912 along their long axes. According to some embodiments, the wedge layer 930 is configured to be pulled away from the pad layer 910 before the pad layer 910 is placed on the surface of the seat, and folded or rolled to form a support to the pad layer 910 from underneath to keep the pad layer 910 substantially horizontal when placed on the surface of the seat. This is especially useful in the event the surface of the seat is angled downward toward the back of the seat, such as in a bucket seat. When supported from underneath by the folded or rolled wedge layer, the pad layer can be kept substantially horizontal when placed on the angled surface.

Figure 10:
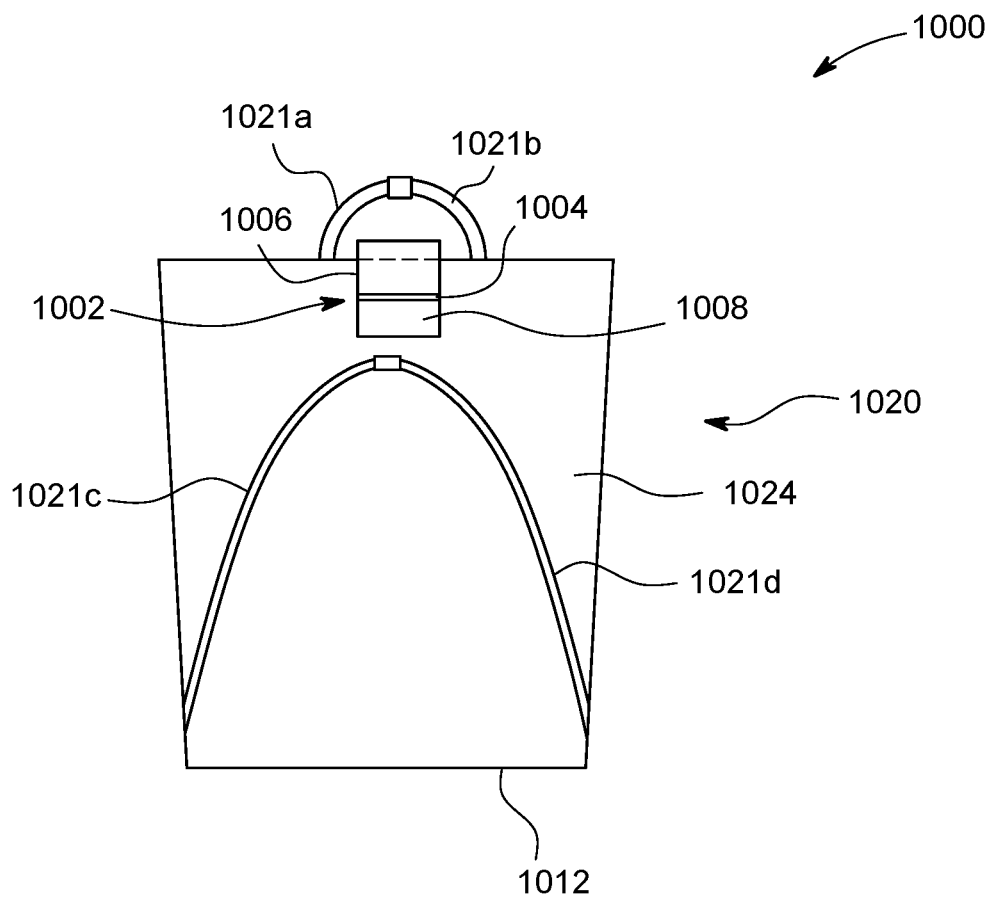
FIG. 10 is a rear view of a foldable apparatus for temporary placement of a living object on a seat, in a folded configuration, according to various embodiments.

FIG. 10 is a rear view of a foldable apparatus 1000 for temporary placement of a living object on a seat, in a folded configuration, according to various embodiments. The foldable apparatus 1000 comprises:
- a pad layer comprising a first panel defining a perimeter and including a first edge 1012, wherein the living object is placed on the first panel of the pad layer when the foldable apparatus 1000 is unfolded and the pad layer is positioned substantially horizontally on the surface of the seat; and
- a back layer 1020 foldably connected to the pad layer along the first edge 1012, the back layer 1020 comprising one or more straps 1021a, 1021b, 1021c and 1021d that attach the back layer 1020 to the back of the seat.

According to some embodiments, one or both of the pad layer and the back layer 1020 comprise a first connector configured to secure the pad layer and the back layer 1020 to each other, thereby keeping the foldable apparatus 1000 in a folded configuration, and to allow unfolding of the foldable apparatus 1000 with one-hand operation.

According to some embodiments, the pad layer and the back layer 1020 are detachable from each other along the first edge 1012 via a first edge connector.

According to some embodiments, the back layer 1020 may comprise a strap holder 1002 for restraining the straps 1021a, 1021b, 1021c and 1021d from dangling around when they are not used to secure the back layer 1020 to the back of the seat, or during transportation of the foldable apparatus 1000. According to the embodiments illustrated in FIG. 10, the strap holder 1002 can comprise a first part 1004 that attaches the strap holder 1002 to a second surface 1024 of the back layer 1020, and a second part 1006 and a third part 1008 that are detachably connected to each other, which when so connected, are configured to hold and restrain the movement of the straps 1021a, 1021b, 1021c and 1021d. According to the embodiments illustrated in FIG. 10, the second part 1006 and the third part 1008 together constitute a Velcro strap. Other mechanisms of restraining the movement of loose straps are well known to those skilled in the art. The strap holder 1002 need not be attached to the second surface 1024 of the back layer 1020, and can be located anywhere on the foldable apparatus 1000, preferably on the outer surface of the foldable apparatus 1000 when in a folded configuration to allow easy access. In addition, the strap holder 1002 need not hold and retain all the straps on the foldable apparatus. Those skilled in the art will readily appreciate that, for example, to accommodate the length and locations of different straps on the foldable apparatus, a plurality of strap holders can be attached to different locations on the foldable apparatus to hold and retain different straps.

Figure 11:
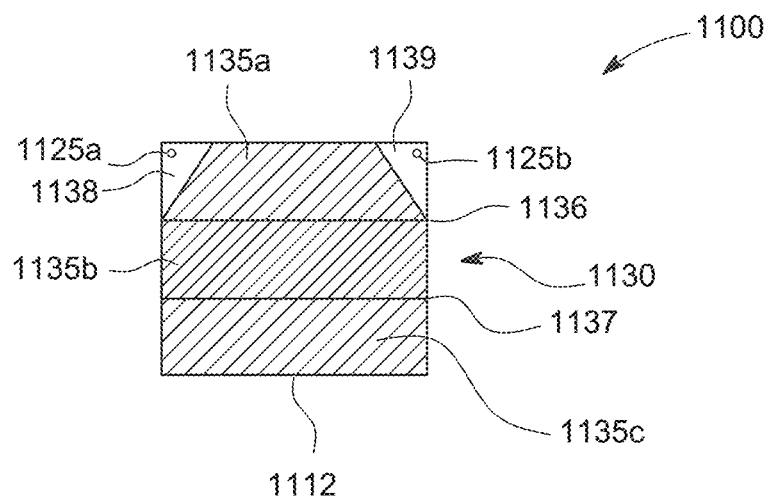
FIG. 11 is a planer view of a wedge layer of a foldable apparatus for temporary placement of a living object on a seat, according to various embodiments.

FIG. 11 is a planer view of a wedge layer 1130 of a foldable apparatus 1100 for temporary placement of a living object on a seat, according to various embodiments. The foldable apparatus 1100 comprises:

a pad layer comprising a first panel defining a perimeter and including a first edge 1112, wherein the living object is placed on the first panel of the pad layer when the foldable apparatus 1100 is unfolded and the pad layer is positioned substantially horizontally on the surface of the seat;

a back layer foldably connected to the pad layer along the first edge 1112; and a wedge layer 1130 foldably connected to the pad layer along the first edge 1112.

According to some embodiments, the pad layer and the wedge layer 1130 are detachable from each other along the first edge 1112 via a second edge connector.

According to some embodiments, one or both of the wedge layer 1130 and the pad layer comprise a second connector 1125a and 1125b that secures the wedge layer 1130 to the pad layer when the wedge layer 1130 is folded against the pad layer and allows unfolding of the wedge layer 1130 from the pad layer with one-hand operation.

According to some embodiments, the wedge layer 1130 comprises a plurality of padded sections 1135a, 1135b and 1135c foldably coupled to and aligned in parallel to each other and to the first edge 1112 along their long axes. According to some embodiments, the wedge layer 1130 is configured to be pulled away from the pad layer before the pad layer is placed on the surface of the seat, and folded or rolled to form a support to the pad layer from underneath to keep the pad layer substantially horizontal when placed on the surface of the seat. This is especially useful in the event the surface of the seat is angled downward toward the back of the seat, such as in a bucket seat. When supported from underneath by the folded or rolled wedge layer, the pad layer can be kept substantially horizontal when placed on the angled surface. As illustrated in FIG. 11, the wedge layer can comprise at least three separate rectangular sections 1135a, 1135b and 1135c and stitching 1136 and 1137 that seal and compartmentalize the filled sections 1135a, 1135b and 1135c. However, the shape or configuration of the wedge layer is not so limited. For example, the wedge layer can be a single substantially continuous piece without the sectioning, according to some embodiments, or can comprise a different number of sections, according to some other embodiments, or can have a different shape from that illustrated in FIG. 11, according to yet some other embodiments, so long as the wedge layer can be folded or rolled to form a support to the pad layer from underneath to keep the pad layer substantially horizontal when placed on an angled surface. Stitching is but one example of a mechanism to separate the sections of a wedge layer, and other mechanisms for such separation are well known to those skilled in the art. According to some embodiments, each section of the wedge layer or the entire wedge layer (in the event it is a single substantially continuous piece) can be filled with a batting or padding material. Other materials that can be used to fill the sections of the wedge layer or the entire wedge layer (in the event it is a single substantially continuous piece) are well known to those skilled in the art, so long as the materials have sufficient substance and can provide substantial structural integrity to the wedge layer when folded or rolled to provide support to the pad layer from underneath. Examples of the padding materials include, but are not limited to, nylon, batting, foam, etc. According to some preferred embodiments, the padding materials are non-toxic to the living thing intended to be placed on a seat using the foldable apparatus of the present disclosure. According to some embodiments, the wedge layer or each section thereof can comprise a cover made of fleece. Other materials that can be used to cover the wedge layer or each section thereof are well known to those skilled in the art.

According to the embodiments illustrated in FIG. 11, the section 1135a of the wedge layer 1130 comprises a second connector 1125a and 1125b that secures the wedge layer 1130 to the pad layer when the wedge layer 1130 is folded against the pad layer and allows unfolding of the wedge layer 1130 from the pad layer with one-hand operation. According to the embodiments illustrated in FIG. 11, section 1135a is not filled by batting or padding materials throughout; the areas 1138 and 1139 surrounding each of the second connector 1125a and 1125b are not filled with any batting or padding material. This can be achieved by including additional seals between each of those areas 1138 and 1139 and the rest of the section 1135a with, for example, stitching. Those skilled in the art will readily appreciate that the absence of the padding or batting materials in areas 1138 and 1139 can make the installation of the second connector 1125a and 1125b easier on the wedge layer 1130 than through the padding or batting materials, although such absence is not absolutely necessary. Those skilled in the art will also readily appreciate that, for reasons such as lightweight, one or more sections of the wedge layer can be further segmented or compartmentalized into different regions, each filled with padding or batting materials, rather than being one compartment filled with padding or batting materials throughout.

According to some embodiments of the present disclosure, the entire apparatus of the present disclosure or any portion thereof may comprise one or more types of fabrics well known to those skilled in the art. Such fabrics can either be the major material of the entire apparatus or such portion thereof, or can function as a cover or protectant that constitutes part or the entirety of the surface of the foldable apparatus or such portion thereof. According to some embodiments, the pad layer of the present disclosure can comprise or be made of a polyester material. According to some embodiments, the two sides of the first panel can each comprise different materials. For example, the bottom side of the first panel when placed on the surface of the seat, which, when the foldable apparatus is folded, would be facing the wedge layer (when the foldable apparatus comprises a wedge layer) or exposed (when the foldable apparatus does not include a wedge layer), can comprise a shell fabric, e.g., nylon, while the top side of the first panel when placed on the surface of the seat, which would be in direct contact with the living object and, when the foldable apparatus is folded, would be hidden and facing the back layer, can comprise laminated cotton for easy wipe cleaning. According to some embodiments, the pad layer can be filled with a material well known to those skilled in the art to give shape to the pad layer, such as foam. According to some embodiments, the pad layer can comprise a heating element so that the foldable apparatus of the present disclosure can keep the living object placed on the pad layer warm. Such heating element can be powered by a heating element similar to that found in electric blankets or smaller electric heating apparatuses, which are well known to those skilled in the art. According to some embodiments, the heating element is powered by one or more batteries. According to other embodiments, the heating element is powered by external power sources. Suitable external power sources are well known to those skilled in the art, and include, but are not limited to, DC power sources such as power banks and power sources in vehicles, and AC power sources, either as wall outlets or as provided in some vehicles. According to some embodiments, a rechargeable battery can be incorporated in the pad layer that can be trickle charged, so that it is always ready for use.

According to some embodiments, the wedge layer or sections thereof, or the entire apparatus of the present disclosure or any part thereof, can be covered by a soft fabric material such as fleece. Such fabrics can have attributes, features or characteristics suitable for the intended use of the foldable apparatus. For example, those skilled in the art are well aware of different choices for such fabrics with different sturdiness, heat resistance, waterproof level, and washability, among other attributes. According to some embodiments, the wedge layer or sections thereof, or the entire apparatus of the present disclosure or any part thereof, can be made of or covered by a suitable hard material well known to those skilled in the art. According to some preferred embodiments, the fabrics or other materials that form the entirety or one or more parts of the apparatus of the present disclosure are non-toxic to the living thing intended to be placed on a seat using the foldable apparatus of the present disclosure.

Figures 12, 13:
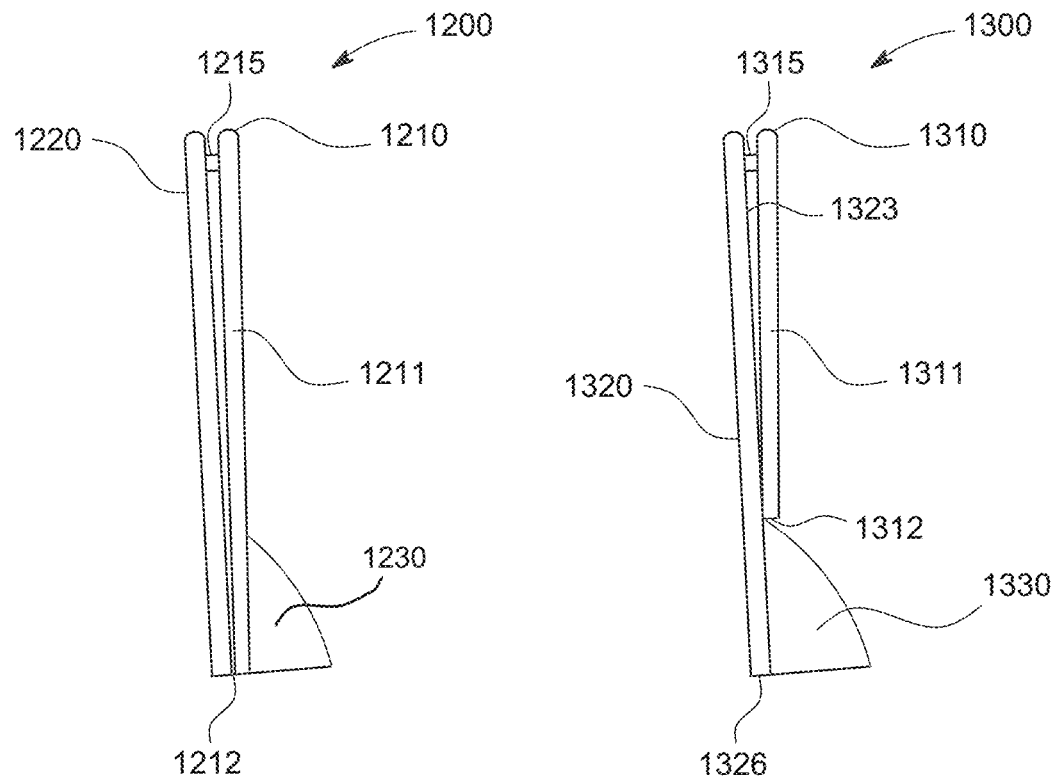
FIG. 12 is a side view of a foldable apparatus for temporary placement of a living object on a seat, in a folded configuration, according to various embodiments.
FIG. 13 is a side view of a foldable apparatus for temporary placement of a living object on a seat, in a folded configuration, according to various embodiments.

FIG. 12 is a side view of a foldable apparatus 1200 for temporary placement of a living object on a seat comprising a surface and a back, in a folded configuration, according to various embodiments. The foldable apparatus 1200 comprises:

a back layer 1220 comprising one or more straps configured to attach the back layer 1220 to the back of the seat and a pad layer 1210 comprising a first panel 1211 defining a perimeter and including a first edge 1212, wherein the living object is placed on the first panel 1211 of the pad layer 1210 when the foldable apparatus 1200 is unfolded and the pad layer 1210 is positioned substantially horizontally on the surface of the seat, and a first wedge portion 1230 removably attached to the first panel 1211 in close proximity to the first edge 1212 and opposite the back layer 1220 such that when the foldable apparatus 1200 is folded, the first wedge portion 1230 is separated from the back layer 1220 by the first panel 1211.

According to some embodiments, the pad layer 1210 and the back layer 1220 are foldably connected to each other along the first edge 1212 via a first edge connector. According to some embodiments, one or both of the pad layer 1210 and the back layer 1220 comprise a first connector 1215 configured to secure the pad layer 1210 and the back layer 1220 to each other, thereby keeping the foldable apparatus 1200 in a folded configuration, and to allow unfolding of the foldable apparatus 1220 with one-hand operation. According to some embodiments, the first wedge portion 1230 is configured to provide support to the first panel 1211 from underneath to keep the first panel 1211 substantially horizontal when the foldable apparatus 1200 is unfolded and the pad layer 1210 is placed on the surface of the seat. This is especially useful in the event the surface of the seat is angled downward toward the back of the seat, such as in a bucket seat. When supported from underneath by the first wedge portion, the pad layer can be kept substantially horizontal when placed on the angled surface.

According to some embodiments, certain aspect(s) of the pad layer 1210 and/or the back layer 1220 of the foldable apparatus 1200 are the same as those in connection with the pad layer and/or the back layer, respectively, of the foldable apparatuses in the preceding embodiments described above. According to some embodiments, the first wedge portion 1230 of the foldable apparatus 1200 is of a prism shape, the long axis of which is parallel to the first edge 1212. According to some embodiments, the ends of the prism shape can be triangular, rectangular, square, trapezoidal, circular, oval, or any other shape well known to those skilled in the art. For example, according to the embodiments illustrated in FIG. 12, the ends of the prism shape are triangular with a curved long edge. According to some embodiments, the first wedge portion can be a single piece of material that can provide support to the first panel from underneath to keep the first panel substantially horizontal when the foldable apparatus is unfolded and the pad layer is placed on the angled surface. Materials suitable for such purposes are well known to those skilled in the art. According to some embodiments, the first wedge portion can comprise a compartment filled with any of such materials and covered by any suitable material, such as those described in connection with the cover of the wedge layer in the preceding embodiments described above. According to some embodiments, the first wedge portion is attached to the first panel using a Velcro mechanism. Those skilled in the art will readily appreciate that other mechanisms of connection, such as those described in connection with the first connector or the second connector, can also be used to attach the first wedge portion to the first panel.

FIG. 13 is a side view of a foldable apparatus 1300 for temporary placement of a living object on a seat comprising a surface and a back, in a folded configuration, according to various embodiments. The foldable apparatus 1300 comprises:

a pad layer 1310 comprising a first panel 1311 defining a perimeter and including a first edge 1312, wherein the living object is placed on the first panel 1311 of the pad layer 1310 when the foldable apparatus 1300 is unfolded and the pad layer 1310 is positioned substantially horizontally on the surface of the seat; and a back layer 1320 comprising one or more straps configured to attach the back layer 1320 to the back of the seat, and a first surface 1323 that faces the pad layer 1310 when the foldable apparatus is in the folded configuration, the first surface 1323 comprising a first end 1326 that is at the bottom of the first surface 1323 when the back layer 1320 is attached to the back of the seat, and a second wedge portion 1330 removably attached to the first surface 1323 at or near the first end 1326.

According to some embodiments, one or both of the pad layer 1310 and the back layer 1320 comprise a first connector 1315 configured to secure the pad layer 1310 and the back layer 1320 to each other, thereby keeping the foldable apparatus 1300 in a folded configuration and to allow unfolding of the foldable apparatus 1320 with one-hand operation. According to some embodiments, the pad layer 1310 is foldably connected to the back layer 1320 along the first edge 1312 at or immediately next to the second wedge portion 1330 opposite the first end 1326. According to some embodiments, the second wedge portion 1330 is configured to provide support to the pad layer 1310 from underneath to keep the pad layer 1310 substantially horizontal when the foldable apparatus 1300 is unfolded and the pad layer 1310 is placed on the surface of the seat. This is especially useful in the event the surface of the seat is angled downward toward the back of the seat, such as in a bucket seat. When supported from underneath by the second wedge portion, the pad layer can be kept substantially horizontal when placed on the angled surface.

According to some embodiments, certain aspect(s) of the pad layer 1310 and/or the back layer 1320 of the foldable apparatus 1300 are the same as those in connection with the pad layer and/or the back layer, respectively, of the foldable apparatuses in the preceding embodiments described above. According to some embodiments, the second wedge portion 1330 of the foldable apparatus 1300 is of a prism shape, the long axis of which is parallel to the first edge 1312. According to some embodiments, the ends of the prism shape can be triangular, rectangular, square, trapezoidal, circular, oval, or any other shape well known to those skilled in the art. For example, according to the embodiments illustrated in FIG. 13, the ends of the prism shape are triangular with a curved long edge. According to some embodiments, the second wedge portion can be a single piece of material that can provide support to the first panel from underneath to keep the first panel substantially horizontal when the foldable apparatus is unfolded and the pad layer is placed on the angled surface. Materials suitable for such purposes are well known to those skilled in the art. According to some embodiments, the second wedge portion can comprise a compartment filled with any of such materials and covered by any suitable material, such as those described in connection with the cover of the wedge layer in the preceding embodiments described above. According to some embodiments, the second wedge portion is attached to the first panel using a Velcro mechanism. Those skilled in the art will readily appreciate that other mechanisms of connection, such as those described in connection with the first connector or the second connector, can also be used to attach the second wedge portion to the first panel.

Figure 14:
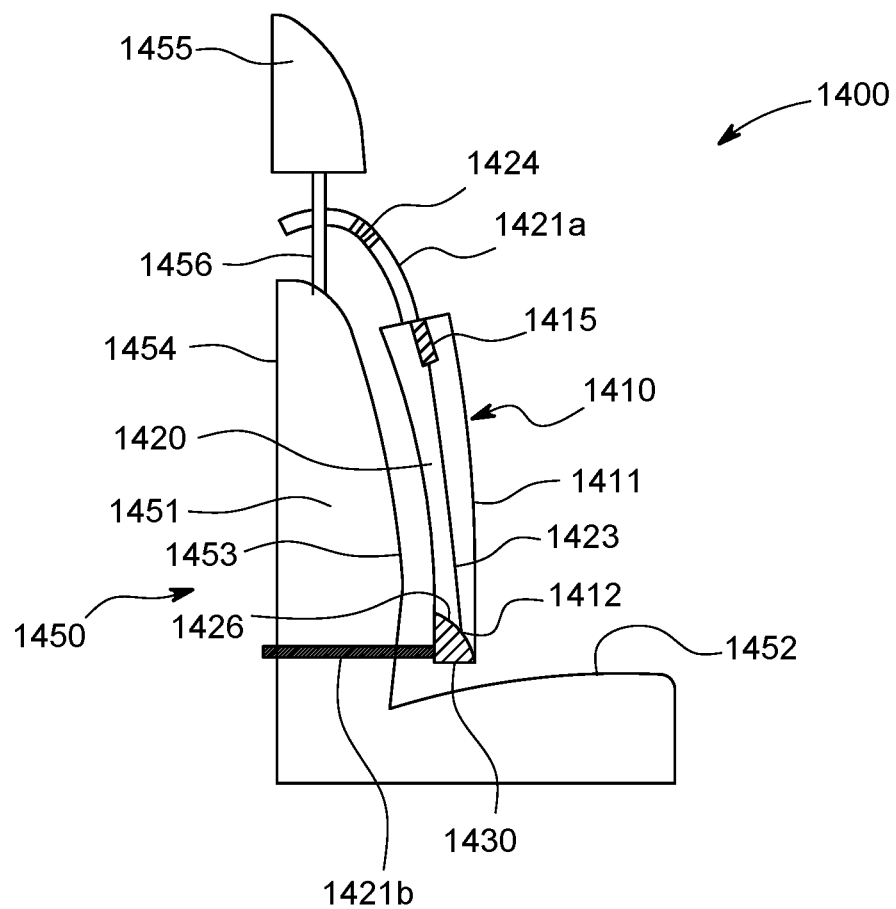
FIG. 14 is a side view of a foldable apparatus for temporary placement of a living object on a seat comprising a surface and a back, in a folded configuration against the back of the seat, according to various embodiments.

FIG. 14 is a side view of a foldable apparatus 1400 for temporary placement of a living object on a seat 1450 comprising a surface 1452 and a back 1451, in a folded configuration against the back 1451 of the seat 1450, according to various embodiments. The foldable apparatus 1400 comprises:
  a pad layer 1410 comprising a first panel 1411 defining a perimeter and including a first edge 1412, wherein the living object is placed on the first panel 1411 of the pad layer 1410 when the foldable apparatus 1400 is unfolded and the pad layer 1410 is positioned substantially horizontally on the surface 1452 of the seat 1450; and
  a back layer 1420 foldably connected to the pad layer 1410 along the first edge 1412, the back layer 1420 comprising
  one or more straps 1421a and 1421b that attach the back layer 1420 to the back 1451 of the seat 1450, and
  a first surface 1423 that faces the pad layer 1410 when the foldable apparatus is in the folded configuration, the first surface 1423 comprising a first end 1426 that is at the bottom of the first surface 1423 when the back layer 1420 is attached to the back 1451 of the seat 1450, and a second wedge portion 1430 removably attached to the first surface 1423 at or near the first end 1426.

According to some embodiments, the back 1451 of the seat 1450 comprises a front surface 1453 and a back surface 1454, the one or more straps 1421a and 1421b tie the back layer 1420 to the front surface 1453 or the back surface 1454 of the back 1451 of the seat 1450, and the foldable apparatus 1400 is unfolded for the placement of the living object when the back layer 1420 is tied to the front surface 1453 of the back 1451 of the seat 1450.

According to some embodiments, the back layer 1420 can comprise a strap 1421b, the two ends of which are attached to the back layer 1420, that forms a half loop around the back 1451 of the seat 1450 that goes through it and is bounded by it and the back layer 1420 of the foldable apparatus 1400. According to some embodiments, the back layer 1420 can comprise one or more pairs of straps 1421a. Within each pair of straps, each strap comprises one end attached to the back layer 1420, and the other end of each of the straps can be detachably attached to each other, thereby forming a half loop around the back 1451 of the seat 1450 that goes through it and is bounded by it and the back layer 1420 of the foldable apparatus 1400. Mechanisms for attaching straps to the back layer or to each other are well known to those skilled in the art, and include, but are not limited to Velcro closures and parachute clips (such as 1424 illustrated in FIG. 14). Other examples of such mechanisms include those mechanisms applicable to the first connector or the second connector, as described in more detail further above. According to some embodiments, one or more of the straps of the present disclosure can be elastic, thereby rendering the circumference of the half loop of which such strap forms a part adjustable. The straps of the present disclosure can be made with various materials suitable for making straps and well known to those skilled in the art, e.g., nylon. Those skilled in the art will readily appreciate that due to the various shapes and sizes of seat backs, adjustable straps are advantageous and can render the foldable apparatus of the present disclosure usable in connection with substantially all seat backs. Those skilled in the art will also readily appreciate that the straps of the present disclosure need not form a boundary around the widest circumference of the back of a seat. According to the embodiments illustrated in FIG. 14, for example, the back of the seat can have different sections, such as the headrest 1455 and the support 1456 to the headrest 1455 illustrated in FIG. 14, where the support 1456 has the smallest circumference among the different sections of the back 1451 of the seat 1450, and the strap 1421a wraps around the support 1456 instead of a different section with wider circumference than the support 1456 on the back 1451 of the seat 1450.

According to some embodiments, one or both of the pad layer 1410 and the back layer 1420 comprise a first connector 1415 configured to secure the pad layer 1410 and the back layer 1420 to each other, thereby keeping the foldable apparatus 1400 in a folded configuration, and to allow unfolding of the foldable apparatus 1400 with one-hand operation. According to the embodiments illustrated in FIG. 14, the first connector 1415 on the pad layer 1410 is located on the first panel 1411. According to the embodiments illustrated in FIG. 14, the first connector 1415 can be a Velcro closure. Other mechanisms of connection are well known to those skilled in the art, some of which have been described in more detail further above.

According to some embodiments, the foldable apparatus of the present disclosure can remain folded and attached to the back of the seat substantially at all times until it is ready to be unfolded such that the pad layer is placed on the surface of the seat, without affecting the function of the seat as a seat, i.e., when the foldable apparatus is folded and attached to the back of the seat via the straps, the seat can still provide at least a surface for people to sit on or to put items on. If desired, a user of the foldable apparatus can swing the folded apparatus around the back of the seat to expose the front surface of the back of the seat so that people can sit on the surface of the seat and lean against the back of the seat directly without the foldable apparatus between the torso of the sitter and the back of the seat.

According to some embodiments, the pad layer 1410 and the back layer 1420 are detachable from each other along the first edge 1412 via a first edge connector. Such detachability can allow the pad layer and the back layer to be carried separately if needed and be cleaned individually. Such detachability can also allow the pad layer to be used alone in the absence of the back layer, e.g., on other surfaces that do not have a vertical structure such as the back of a seat.

According to some embodiments, certain aspect(s) of the pad layer 1410 and/or the back layer 1420 of the foldable apparatus 1400 are the same as those in connection with the pad layer and/or the back layer, respectively, of the foldable apparatuses in the preceding embodiments described above. According to some embodiments, the second wedge portion 1430 of the foldable apparatus 1400 is of a prism shape, the long axis of which is parallel to the first edge 1412. According to some embodiments, the ends of the prism shape can be triangular, rectangular, square, trapezoidal, circular, oval, or any other shape well known to those skilled in the art. For example, according to the embodiments illustrated in FIG. 14, the ends of the prism shape are triangular. According to some embodiments, the second wedge portion can be a single piece of material that can provide support to the first panel from underneath to keep the first panel substantially horizontal when the foldable apparatus is unfolded and the pad layer is placed on the angled surface. Materials suitable for such purposes are well known to those skilled in the art. According to some embodiments, the second wedge portion can comprise a compartment filled with any of such materials and covered by any suitable material, such as those described in connection with the cover of the wedge layer in the preceding embodiments described above. According to some embodiments, the second wedge portion is attached to the first panel using a Velcro mechanism. Those skilled in the art will readily appreciate that other mechanisms of connection, such as those described in connection with the first connector or the second connector, can also be used to attach the second wedge portion to the first panel.

According to some embodiments, the foldable apparatus of the present disclosure can be made portable, especially when folded. For example, one or more straps of the present disclosure can serve as a handle that facilitates easy carrying of the foldable apparatus when folded. Even in the absence of the straps, the foldable apparatuses of the present disclosure can be made with lightweight materials well known to those skilled in the art and of a suitable size such that they can be carried along with ease. When in a folded configuration, all the pockets and hooks and loops, and the side panels are hidden, and, if desired, the straps can be hidden within the folded apparatus, too. As a result, carrying the foldable apparatus of the present disclosure around would not be unsightly. Those skilled in the art are well aware of the design and material of the outer surface of the foldable apparatus of the present disclosure when in a folded configuration, e.g., the same materials used for the surface of a laptop computer bag, so that the appearance of the foldable apparatus when carried in a folded configuration would not reveal the use or purpose of the foldable apparatus to an observer. According to some embodiments, the apparatus of the present disclosure can be about 19" in width and between about 19" to about 23" in height. According to some embodiments, the pad layer can be made of a polyester material, though as those skilled in the art can appreciate, other suitable materials can also be used. According to some embodiments, the side panels of the present disclosure can be about 4" high when unfolded from the first panel and erected.

The present disclosure also provides a system for temporary placement of a living object, the system comprising:
  a seat comprising a surface and a back, and
  an unfolded foldable apparatus comprising
  a pad layer positioned substantially horizontally on the surface of the seat, the pad layer comprising a first panel defining a perimeter and including a first edge, and
  a back layer foldably connected to the pad layer along the first edge, the back layer comprising one or more straps configured to attach the back layer to the back of the seat,
  wherein the living object is placed on the first panel of the pad layer, and one or both of the pad layer and the back layer comprise a first connector configured to secure the pad layer and the back layer to each other thereby keeping the foldable apparatus in a folded configuration, and to allow unfolding of the foldable apparatus with one-hand operation.

According to some embodiments, the back layer further comprises a first surface that faces the pad layer when the foldable apparatus is in the folded configuration and one or more pockets or one or more hooks or loops configured to hang items on the first surface, and to be accessible when the foldable apparatus is unfolded, and hidden when the foldable apparatus is folded.

According to some embodiments, the first panel of the pad layer comprises a second edge and the pad layer further comprises a side panel foldably connected to the first panel along the second edge, and the side panel is configured to be folded over the first panel when the foldable apparatus is folded, and forms a barrier positioned adjacent to the first panel when unfolded from the first panel when the foldable apparatus is in an unfolded configuration, wherein the barrier is configured to prevent the living object placed on the first panel of the pad layer from moving outside the perimeter when the pad layer is positioned horizontally on the surface of the seat.

According to some embodiments, the system further comprises a wedge layer foldably connected to the pad layer along the first edge, the wedge layer comprising a second connector configured to secure the wedge layer to the pad layer when the wedge layer is folded against the pad layer, and to allow unfolding of the wedge layer from the pad layer with one-hand operation, and a plurality of padded sections foldably coupled to and aligned in parallel to each other and to the first edge along their long axes, wherein the wedge layer is configured to be pulled away from the pad layer before the pad layer is placed on the surface of the seat, and folded to form a support to the pad layer from underneath to keep the pad layer substantially horizontal when placed on the surface of the seat.

The present disclosure also provides a method of hanging an child's diaper on a seat comprising a surface and a back, the method comprising:
  attaching a foldable apparatus to the back of the seat in a folded configuration, the foldable apparatus comprising a pad layer comprising a first panel defining a perimeter and including a first edge, and a back layer foldably connected to the pad layer along the first edge, the back layer comprising one or more straps configured to attach the back layer to the back of the seat, wherein one or both of the pad layer and the back layer comprise a connector configured to secure the pad layer and the back layer to each other, thereby keeping the foldable apparatus in the folded configuration;

unfolding the foldable apparatus and placing the pad layer substantially horizontally on the surface of the seat;

placing a child on the pad layer; and changing the child's diaper.

According to some embodiments, the child can be an infant. According to some other embodiments, the child can be a toddler.

According to some embodiments, the back layer comprises a first surface that faces the pad layer when the foldable apparatus is in the folded configuration and one or more pockets on the first surface, configured to be accessible when the foldable apparatus is unfolded, and hidden when the foldable apparatus is folded, at least one pocket comprises one or more diapers, the method comprises removing a diaper from the pocket, and changing the child's diaper comprises replacing the child's diaper with the diaper removed from the pocket.

According to some embodiments, the back layer comprises a first surface that faces the pad layer when the foldable apparatus is in the folded configuration and one or more pockets on the first surface, configured to be accessible when the foldable apparatus is unfolded, and hidden when the foldable apparatus is folded, at least one pocket comprises one or more wet wipes, the method comprises removing a wet wipe from the pocket, and changing the child's diaper comprises wiping the child with the wet wipe removed from the pocket.

Those skilled in the art and users of the foldable apparatus of the present disclosure will readily know that the one or more pockets on the first surface of the back layer can be used to hold one or more other items useful in connection with changing a child's diaper, e.g., hand sanitizer, wet/dry bags, etc. Those skilled in the art and users of the foldable apparatus of the present disclosure will also readily appreciate that it is advantageous for a child to be distracted during a diaper change so as to reduce the struggle from the child during the diaper change. Accordingly, one or more pockets of the foldable apparatus of the present disclosure can contain items of entertainment or other distraction well known to those skilled in the art that can facilitate quick and easy diaper changes. For example, a transparent pocket of a suitable size can contain a mobile phone or a tablet (such as an iPad®) to provide the desirable distraction during a diaper change.

According to some embodiments, the method of changing a child's diaper on a seat can comprise providing a barrier adjacent to the first panel before placing the child on the pad layer, wherein the barrier is configured to prevent the infant from moving outside the perimeter when being placed on the pad layer. According to some embodiments, such barrier can be provided by one or more side panels of the present disclosure described in detail further above. According to some embodiments, such barrier can also serve as a cushion that protects a child's body parts such as head from direct contact with the seat or any hard object close to the seat. For example, in the event the seat is a car seat, the borders provided by padded side panels of the presented disclosure can protect a baby's soft head from bumping into seat buckles or the center console.

According to some embodiments, certain other aspect(s) of the pad layer and/or the back layer of the foldable apparatus used in the method are the same as those in connection with the pad layer and/or the back layer, respectively, of the foldable apparatuses in the preceding embodiments described further above.

According to some embodiments, the surface of the seat is angled downward toward the back of the seat, and the method of changing a child's diaper on a seat comprises providing a wedge on the surface of the seat before unfolding the foldable apparatus and placing the pad layer on the surface of the seat to support the pad layer from underneath and keep it substantially horizontal when placed on the angled surface. According to some embodiments, such wedge can be provided by the wedge layer or the wedge portion of the present disclosure, each as described in detail further above.

The present disclosure further provides a method of entertaining a child on a seat comprising a surface and a back, the method comprising:

attaching a foldable apparatus to the back of the seat in a folded configuration, the foldable apparatus comprising a pad layer comprising a first panel defining a perimeter and including a first edge, and a back layer foldably connected to the pad layer along the first edge, the back layer comprising one or more straps configured to attach the back layer to the back of the seat, a first surface that faces the pad layer when the foldable apparatus is in the folded configuration, and one or more hooks or loops on the first surface configure to hang items when the back layer is attached to the back of the seat, and to be accessible when the foldable apparatus is unfolded, and hidden when the foldable apparatus is folded, wherein one or both of the pad layer and the back layer comprise a connector configured to secure the pad layer and the back layer to each other, thereby keeping the foldable apparatus in the folded configuration;

unfolding the foldable apparatus and placing the pad layer substantially horizontally on the surface of the seat;

placing a child on the pad layer; and providing entertainment to the child by hanging at least one item of entertainment to at least one hook or loop on the first surface of the back layer.

According to some embodiments, the child can be an infant. According to some other embodiments, the child can be a toddler.

According to some embodiments, the item of entertainment hung to the hook or loop can be a stuffed animal or other toy that allows touching by the child. According to some embodiments, the loop of the present disclosure can itself be a toy loop that can provide entertainment to the child.

According to some embodiments, the method of entertaining a child on a seat can comprise providing a barrier adjacent to the first panel before placing the child on the pad layer, wherein the barrier is configured to prevent the child from moving outside the perimeter when being placed on the pad layer. According to some embodiments, such barrier can be provided by one or more side panels of the present disclosure described in detail further above. According to some embodiments, such barrier can also serve as a cushion that protects a child's body parts such as head from direct contact with the seat or any hard object close to the seat. For example, in the event the seat is a car seat, the borders provided by padded side panels of the presented disclosure can protect a baby's soft head from bumping into seat buckles or the center console.

According to some embodiments, certain other aspect(s) of the pad layer and/or the back layer of the foldable apparatus used in the method are the same as those in connection with the pad layer and/or the back layer, respectively, of the foldable apparatuses in the preceding embodiments described further above.

According to some embodiments, the surface of the seat is angled downward toward the back of the seat, and the method of entertaining a child on a seat comprises providing a wedge on the surface of the seat before unfolding the foldable apparatus and placing the pad layer on the surface of the seat to support the pad layer from underneath and keep it substantially horizontal when placed on the angled surface. According to some embodiments, such wedge can be provided by the wedge layer or the wedge portion of the present disclosure, each as described in detail further above.

The foldable apparatus of the present disclosure can be adapted to be easily installed into an automobile (or other automotive devices such as trains, aircrafts, boats, etc.) and readily removed therefrom. According to some embodiments, once installed on a vehicle seat, the foldable apparatus can be adapted to be opened and closed with one hand. According to some embodiments, once installed on a vehicle seat and unfolded, the side panels can be erected with one hand. According to some embodiments, once installed and unfolded, a user of the foldable apparatus of the present disclosure can access the contents of the pockets on the first surface of the back layer with one hand, when the user may have a baby in the other arm. Therefore, the foldable apparatuses and the method described in the present disclosure can be adapted to provide a portable and convenient diaper changing station and an easy method of changing diapers.

Although many embodiments disclosed herein are described as "comprising" certain components or steps, which means that they can include other components or steps in addition to what is being disclosed herein, inclusion of additional components or steps are not necessary. Therefore, where "comprise" is recited herein, those embodiments are to be understood to include embodiments consisting of and embodiments consisting essentially of the disclosed components or steps, as applicable.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A foldable apparatus for temporary placement of a living object on a seat comprising a surface and a back, the foldable apparatus comprising:
    a pad layer comprising a first panel defining a perimeter and including a first edge, wherein the living object is to be placed on the first panel of the pad layer when the foldable apparatus is unfolded and the pad layer is positioned substantially horizontally on the surface of the seat;
    a back layer foldably connected to the pad layer along the first edge, the back layer comprising one or more straps configured to attach the back layer to the back of the seat;
    a wedge layer foldably connected to the pad layer along the first edge, the wedge layer comprising a second connector configured to secure the wedge layer to the pad layer when the wedge layer is folded against the pad layer and to allow unfolding of the wedge layer from the pad layer with one-hand operation, and a plurality of padded sections foldably coupled to and aligned in parallel to each other and to the first edge along their long axes,
    wherein the pad layer is positioned along the first edge between the back layer and the wedge layer, and
    the wedge layer is configured to be pulled away from the pad layer before the pad layer is placed on the surface of the seat, and folded to form a support to the pad layer from underneath to keep the pad layer substantially horizontal when placed on the surface of the seat;
    wherein one or both of the pad layer and the back layer comprise a first connector configured to secure the pad layer and the back layer to each other thereby keeping the foldable apparatus in a folded configuration, and to allow unfolding of the foldable apparatus with one-hand operation.

2. The foldable apparatus of claim 1, wherein the back layer further comprises a first surface that faces the pad layer when the foldable apparatus is in the folded configuration and one or more pockets on the first surface, configured to be accessible when the foldable apparatus is unfolded, and hidden when the foldable apparatus is folded.

3. The foldable apparatus of claim 1, wherein the back layer further comprises a first surface that faces the pad layer when the foldable apparatus is in the folded configuration and one or more hooks or loops on the first surface configured to hang items when the back layer is attached to the back of the seat, and to be accessible when the foldable apparatus is unfolded, and hidden when the foldable apparatus is folded.

4. The foldable apparatus of claim 1, wherein
    the first panel of the pad layer comprises a second edge and the pad layer further comprises a side panel foldably connected to the first panel along the second edge, and
    the side panel is configured to be folded over the first panel when the foldable apparatus is folded, and to form a barrier positioned adjacent to the first panel when unfolded from the first panel when the foldable apparatus is in an unfolded configuration, wherein the barrier is configured to prevent the living object placed on the first panel of the pad layer from moving outside the perimeter when the pad layer is positioned horizontally on the surface of the seat.

5. The foldable apparatus of claim 4, wherein the side panel comprises a side connector configured to connect the side panel to the back layer and to, when so connected, pull the side panel away from the first panel when the foldable apparatus is in the unfolded configuration thereby securing the barrier.

6. The foldable apparatus of claim 1, wherein the pad layer and the back layer are detachable from each other along the first edge via a first edge connector.

7. A foldable apparatus for temporary placement of a living object on a seat comprising a surface and a back, the foldable apparatus comprising:
    a pad layer comprising a first panel defining a perimeter and including a first edge, wherein the living object is to be placed on the first panel of the pad layer when the foldable apparatus is unfolded and the pad layer is positioned substantially horizontally on the surface of the seat;
    a back layer foldably connected to the pad layer along the first edge, the back layer comprising one or more straps configured to attach the back layer to the back of the seat;

wherein the back layer further comprises a first surface that faces the pad layer when the foldable apparatus is in the folded configuration, the first surface comprising a first end that is at the bottom of the first surface when the back layer is attached to the back of the seat, and a wedge portion removably attached to the first surface at or near the first end, the pad layer is foldably connected to the back layer at or immediately next to the wedge portion opposite the first end, and the wedge portion is configured to provide support to the pad layer from underneath to keep the pad layer substantially horizontal when the foldable apparatus is unfolded and the pad layer is placed on the surface of the seat.

8. The foldable apparatus of claim 7, wherein the wedge portion is of a prism shape, the long axis of which is parallel to the first edge.

9. The foldable apparatus of claim 1, wherein
the back of the seat comprises a front surface and a back surface,
the one or more straps tie the back layer to the front surface or the back surface of the back of the seat, and
the foldable apparatus is unfolded for the placement of the living object when the back layer is tied to the front surface of the back of the seat.

10. The foldable apparatus of claim 1, wherein the foldable apparatus is portable.

11. The foldable apparatus of claim 7, wherein the back layer further comprises a first surface that faces the pad layer when the foldable apparatus is in the folded configuration and one or more pockets on the first surface, configured to be accessible when the foldable apparatus is unfolded, and hidden when the foldable apparatus is folded.

12. The foldable apparatus of claim 7, wherein the back layer further comprises a first surface that faces the pad layer when the foldable apparatus is in the folded configuration and one or more hooks or loops on the first surface configured to hang items when the back layer is attached to the back of the seat, and to be accessible when the foldable apparatus is unfolded, and hidden when the foldable apparatus is folded.

13. The foldable apparatus of claim 7, wherein
the first panel of the pad layer comprises a second edge and the pad layer further comprises a side panel foldably connected to the first panel along the second edge, and
the side panel is configured to be folded over the first panel when the foldable apparatus is folded, and to form a barrier positioned adjacent to the first panel when unfolded from the first panel when the foldable apparatus is in an unfolded configuration, wherein the barrier is configured to prevent the living object placed on the first panel of the pad layer from moving outside the perimeter when the pad layer is positioned horizontally on the surface of the seat.

14. The foldable apparatus of claim 13, wherein the side panel comprises a side connector configured to connect the side panel to the back layer and to, when so connected, pull the side panel away from the first panel when the foldable apparatus is in the unfolded configuration thereby securing the barrier.

15. The foldable apparatus of claim 7, wherein the pad layer and the back layer are detachable from each other along the first edge via a first edge connector.

16. The foldable apparatus of claim 7, wherein
the back of the seat comprises a front surface and a back surface,
the one or more straps tie the back layer to the front surface or the back surface of the back of the seat, and
the foldable apparatus is unfolded for the placement of the living object when the back layer is tied to the front surface of the back of the seat.

17. The foldable apparatus of claim 7, wherein the foldable apparatus is portable.

18. A system for temporary placement of a living object, the system comprising:
a seat comprising a surface and a back, and
an unfolded foldable apparatus comprising
a pad layer positioned substantially horizontally on the surface of the seat, the pad layer comprising a first panel defining a perimeter and including a first edge, and
a back layer foldably connected to the pad layer along the first edge, the back layer comprising one or more straps configured to attach the back layer to the back of the seat,
wherein the living object is to be placed on the first panel of the pad layer, and one or both of the pad layer and the back layer comprise a first connector configured to secure the pad layer and the back layer to each other thereby keeping the foldable apparatus in a folded configuration, and to allow unfolding of the foldable apparatus with one-hand operation,
the system further comprising a wedge layer foldably connected to the pad layer along the first edge, the wedge layer comprising a second connector configured to secure the wedge layer to the pad layer when the wedge layer is folded against the pad layer, and to allow unfolding of the wedge layer from the pad layer with one-hand operation, and a plurality of padded sections foldably coupled to and aligned in parallel to each other and to the first edge along their long axes,
wherein the pad layer is positioned along the first edge between the back layer and the wedge layer, and the wedge layer is configured to be pulled away from the pad layer before the pad layer is placed on the surface of the seat, and folded to form a support to the pad layer from underneath to keep the pad layer substantially horizontal when placed on the surface of the seat.

19. The system of claim 18, wherein the back layer further comprises a first surface that faces the pad layer when the foldable apparatus is in the folded configuration and one or more pockets or one or more hooks or loops configured to hang items on the first surface, and to be accessible when the foldable apparatus is unfolded, and hidden when the foldable apparatus is folded.

20. The system of claim 18, wherein
the first panel of the pad layer comprises a second edge and the pad layer further comprises a side panel foldably connected to the first panel along the second edge, and
the side panel is configured to be folded over the first panel when the foldable apparatus is folded, and forms a barrier positioned adjacent to the first panel when unfolded from the first panel when the foldable apparatus is in an unfolded configuration, wherein the barrier is configured to prevent the living object placed on the first panel of the pad layer from moving outside the perimeter when the pad layer is positioned substantially horizontally on the surface of the seat.

* * * * *